United States Patent [19]

Jaeger

[11] Patent Number: 5,572,239

[45] Date of Patent: Nov. 5, 1996

[54] OPERATOR/CIRCUIT INTERFACE WITH INTEGRATED DISPLAY SCREEN

[76] Inventor: Denny Jaeger, 6120 Valley View Rd., Oakland, Calif. 94611

[21] Appl. No.: 420,438

[22] Filed: Apr. 10, 1995

Related U.S. Application Data

[63] Continuation of Ser. No. 225,782, Apr. 11, 1994, abandoned, which is a continuation-in-part of Ser. No. 147,545, Nov. 5, 1993, abandoned.

[51] Int. Cl.⁶ ............................................. G09G 5/00
[52] U.S. Cl. ......................... 345/172; 345/184; 341/23
[58] Field of Search .............................. 345/168, 169, 345/170, 171, 172, 173, 184, 905; 341/22, 23, 28, 33, 34

[56] References Cited

U.S. PATENT DOCUMENTS

| | | | |
|---|---|---|---|
| 3,798,611 | 3/1974 | Gallant et al. | 345/172 |
| 4,117,542 | 9/1978 | Klausner et al. | 345/172 |
| 4,445,164 | 4/1984 | Giles, III et al. | |
| 4,502,048 | 2/1985 | Rehm | 345/170 |
| 4,551,717 | 11/1985 | Dreher | 345/170 |
| 4,633,227 | 12/1986 | Menn | 345/172 |
| 4,644,326 | 2/1987 | Villalobos et al. | 345/170 |
| 5,034,602 | 7/1991 | Garcia, Jr. et al. | 345/170 |
| 5,156,049 | 10/1992 | Douglas | 345/184 |
| 5,191,320 | 3/1993 | Mackay | 345/184 |
| 5,266,949 | 11/1993 | Rossi | 341/22 |
| 5,418,760 | 5/1995 | Kawashima et al. | 345/173 |

FOREIGN PATENT DOCUMENTS

| | | |
|---|---|---|
| 0042328 | 4/1977 | Japan . |
| 2038055 | 7/1980 | United Kingdom ............... 345/172 |

*Primary Examiner*—Richard Hjerpe
*Assistant Examiner*—Regina Liang
*Attorney, Agent, or Firm*—Harris Zimmerman

[57] ABSTRACT

Operator interaction with electrical systems is facilitated by providing electromechanical control devices, which have switch buttons, rotary knobs or the like, with flat panel displays that convey information pertaining to the controls that can be changed instantly by a display controller. The display may identify the function of the control, the current setting, create calibration marks or provide other graphics. The images change automatically if the same control is used for multiple functions. In one form of the invention, the display screen has openings in the image area and the controls extend through and protrude from the screen enabling display of graphics in close proximity to the controls. In another form, the settings of controls which are secured to the face of a display screen are optically or magnetically detected by sensors located behind the screen. In still another form of the invention, the display is embedded in a switch key and has an image area that is substantially coextensive with the key. This enables permanent markings, such as are found on computer keyboard keys for example, to be replaced with changeable images that identify multiple functions of the keys.

8 Claims, 19 Drawing Sheets

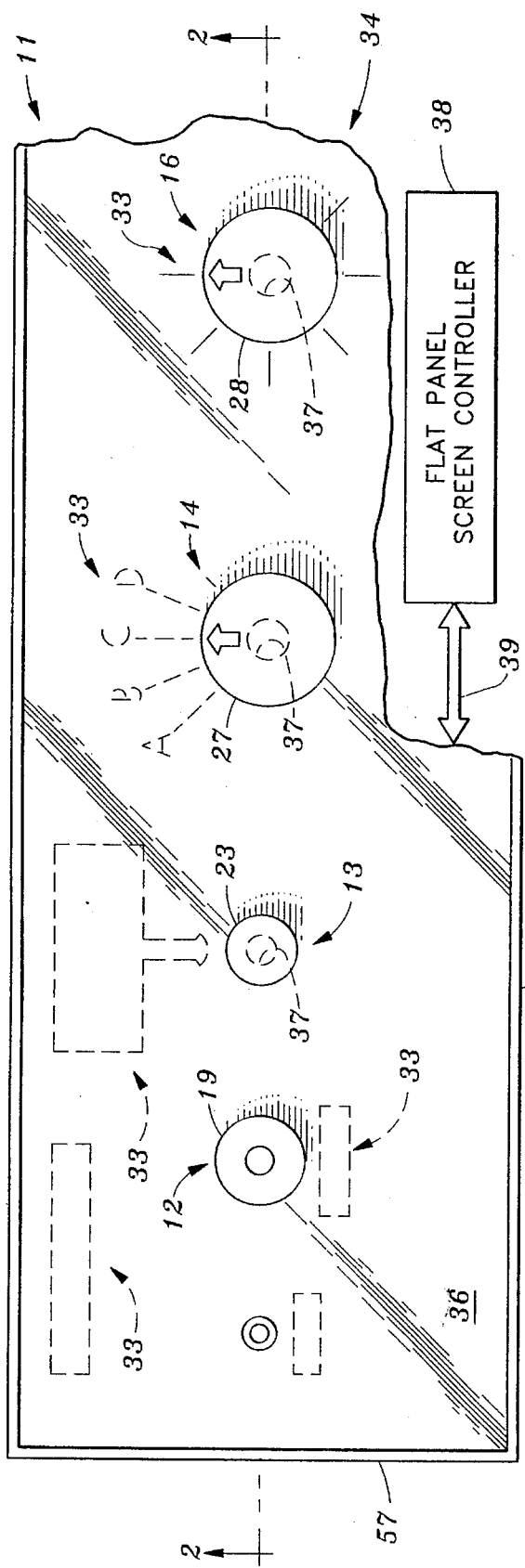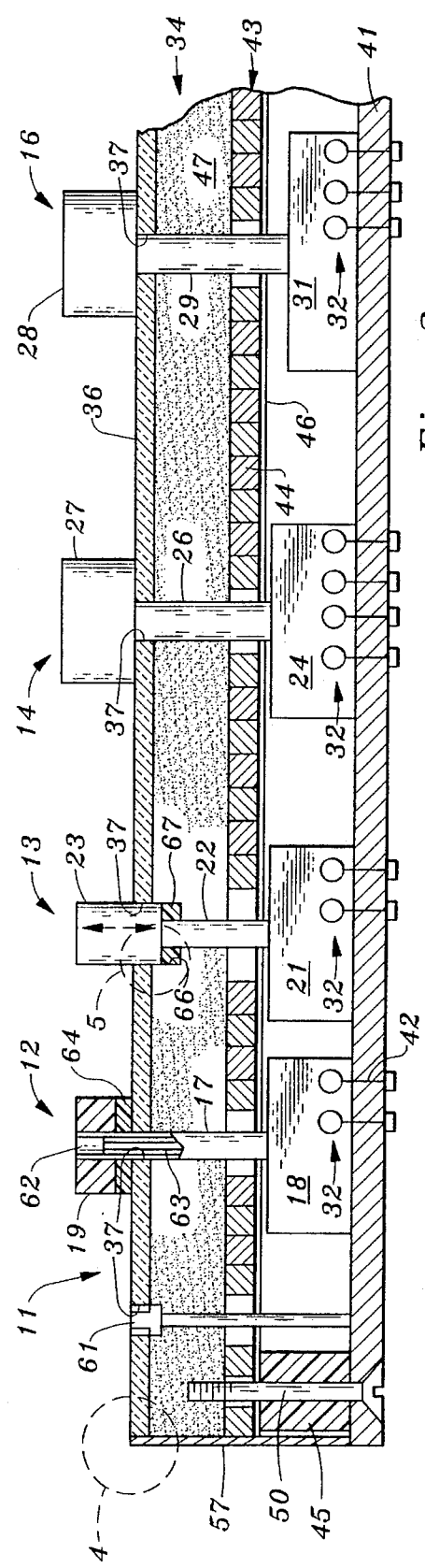

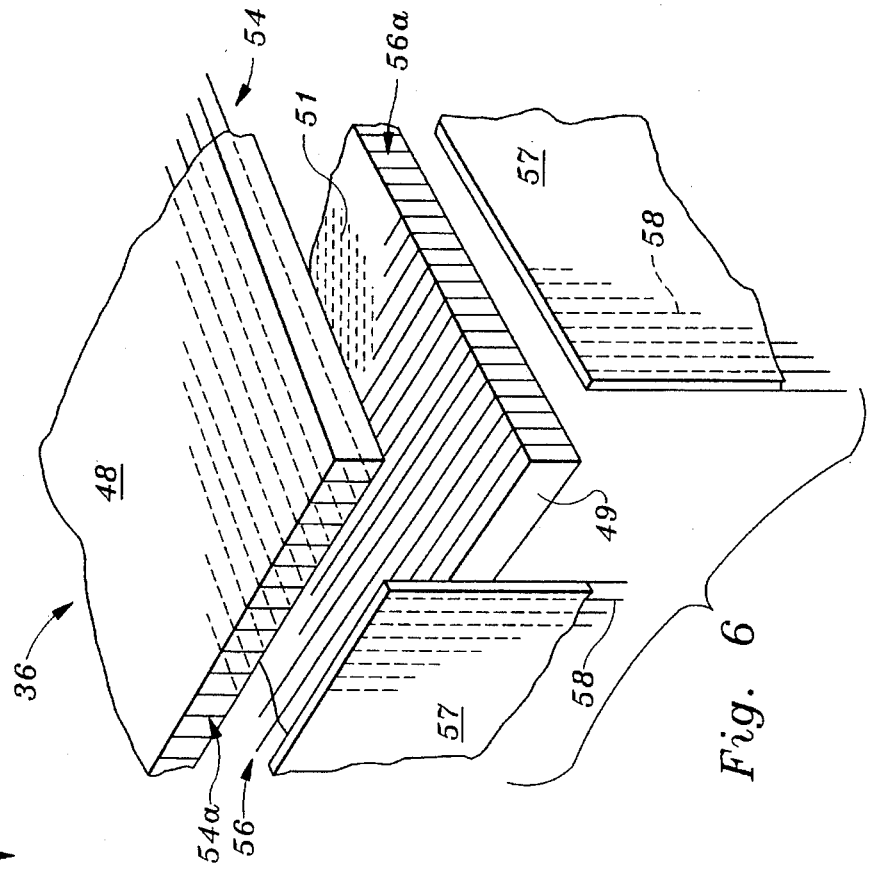
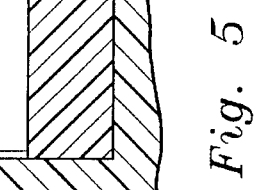
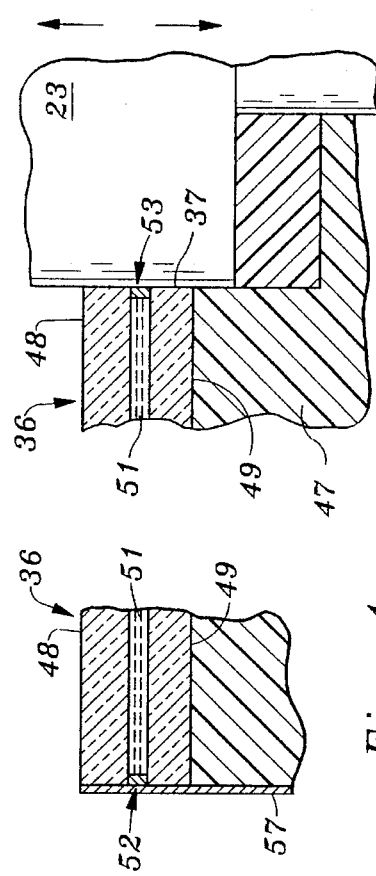
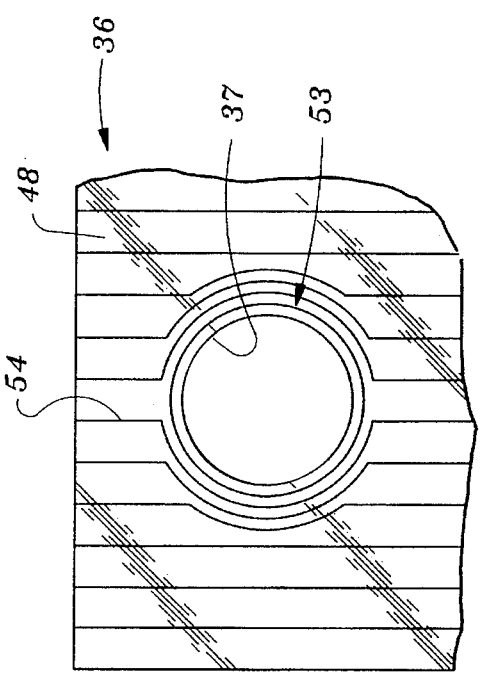

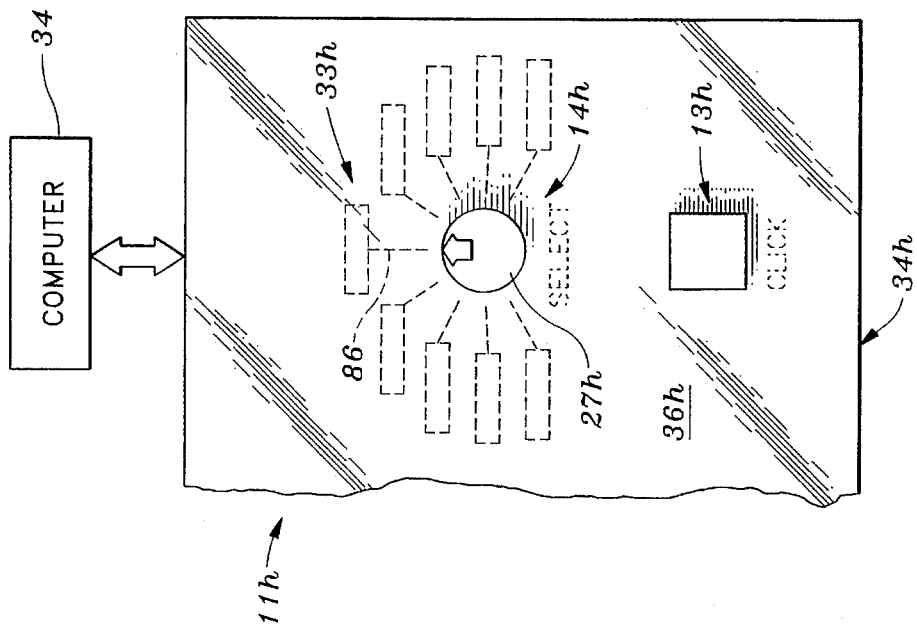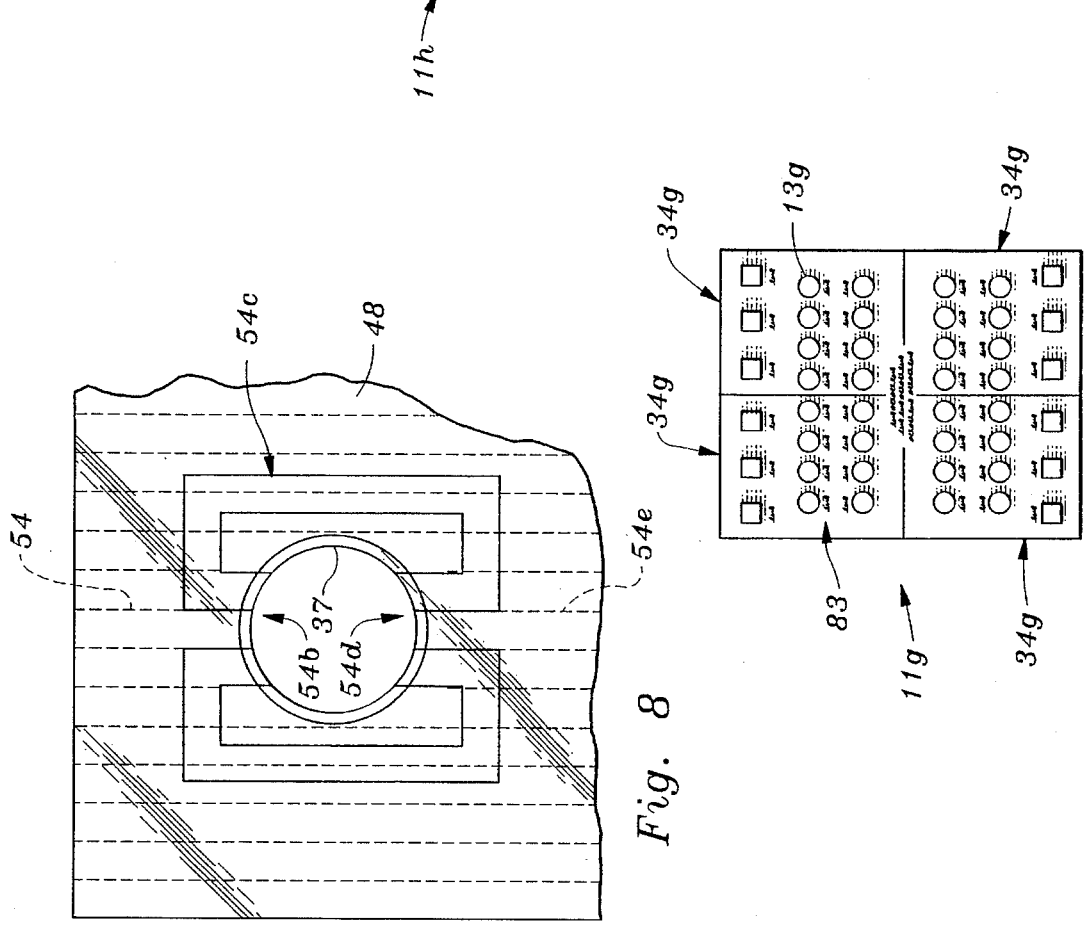

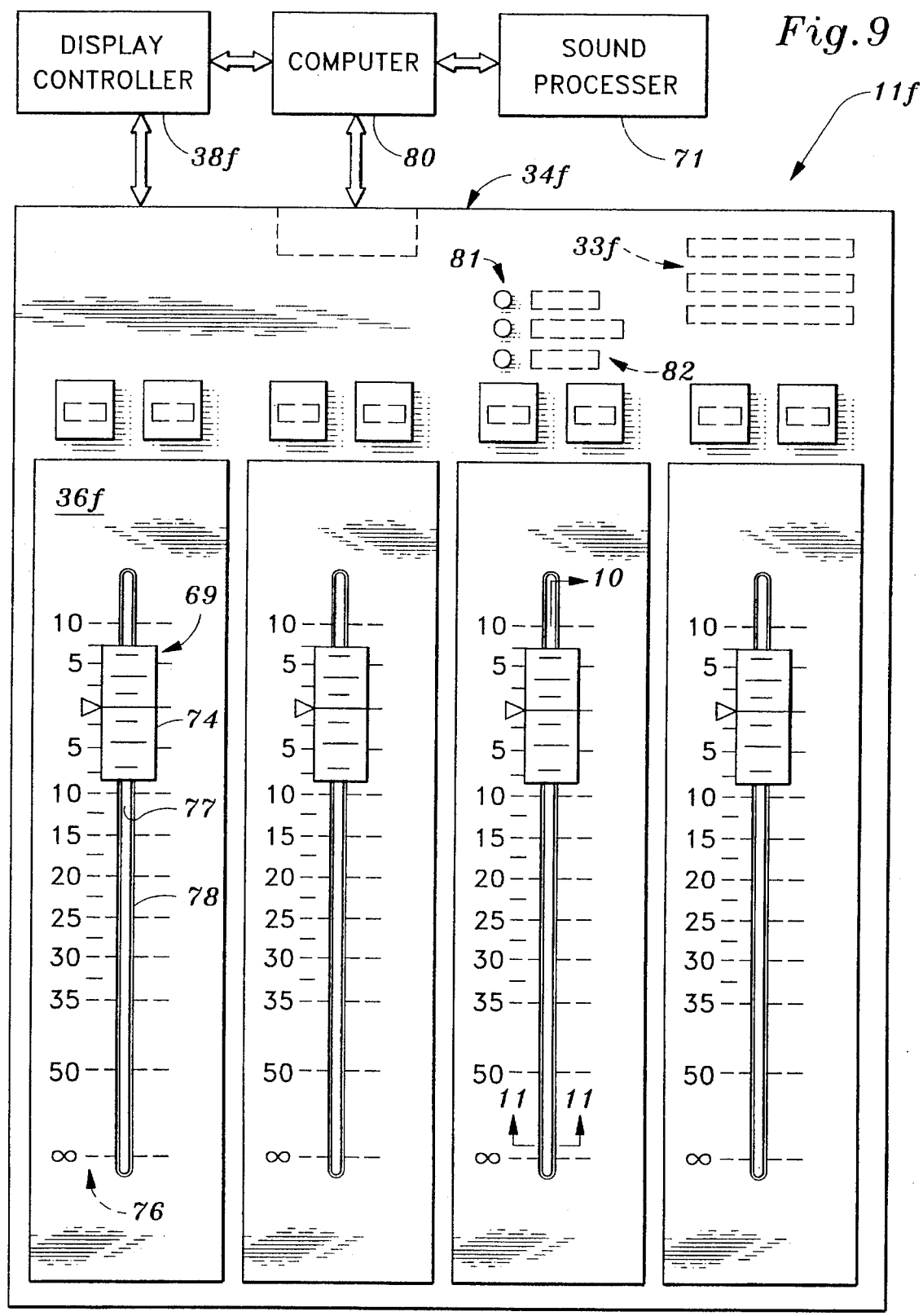

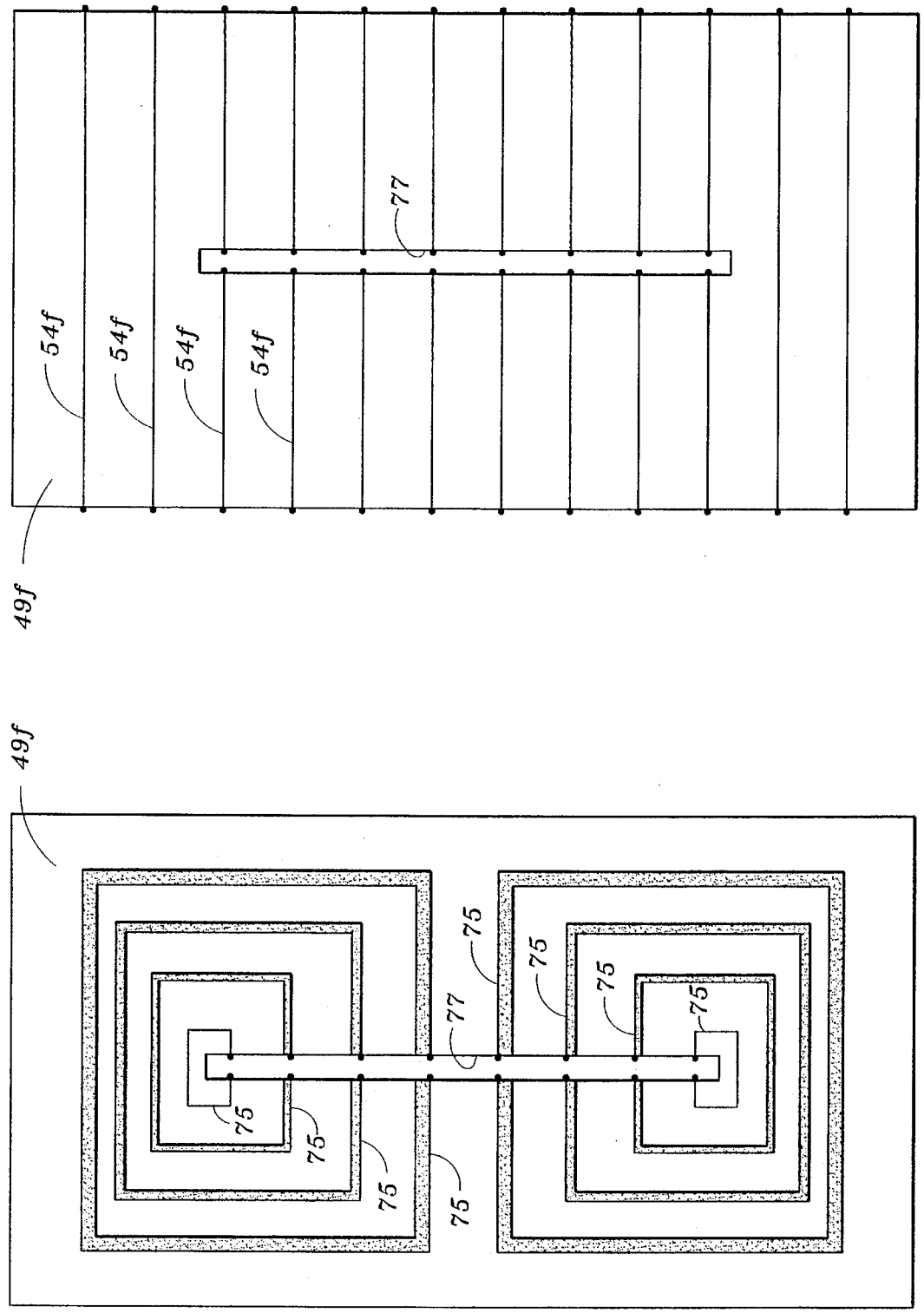

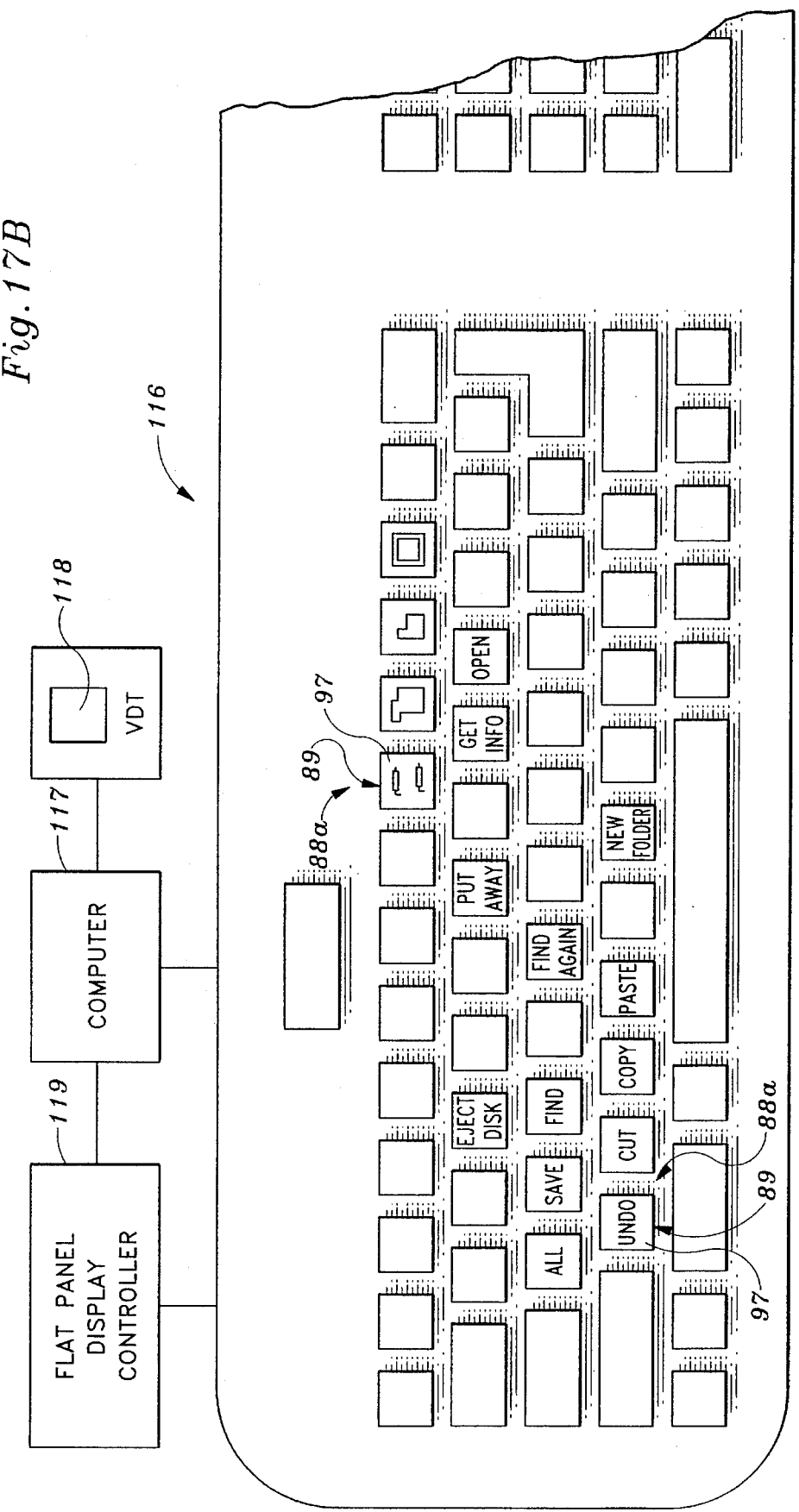

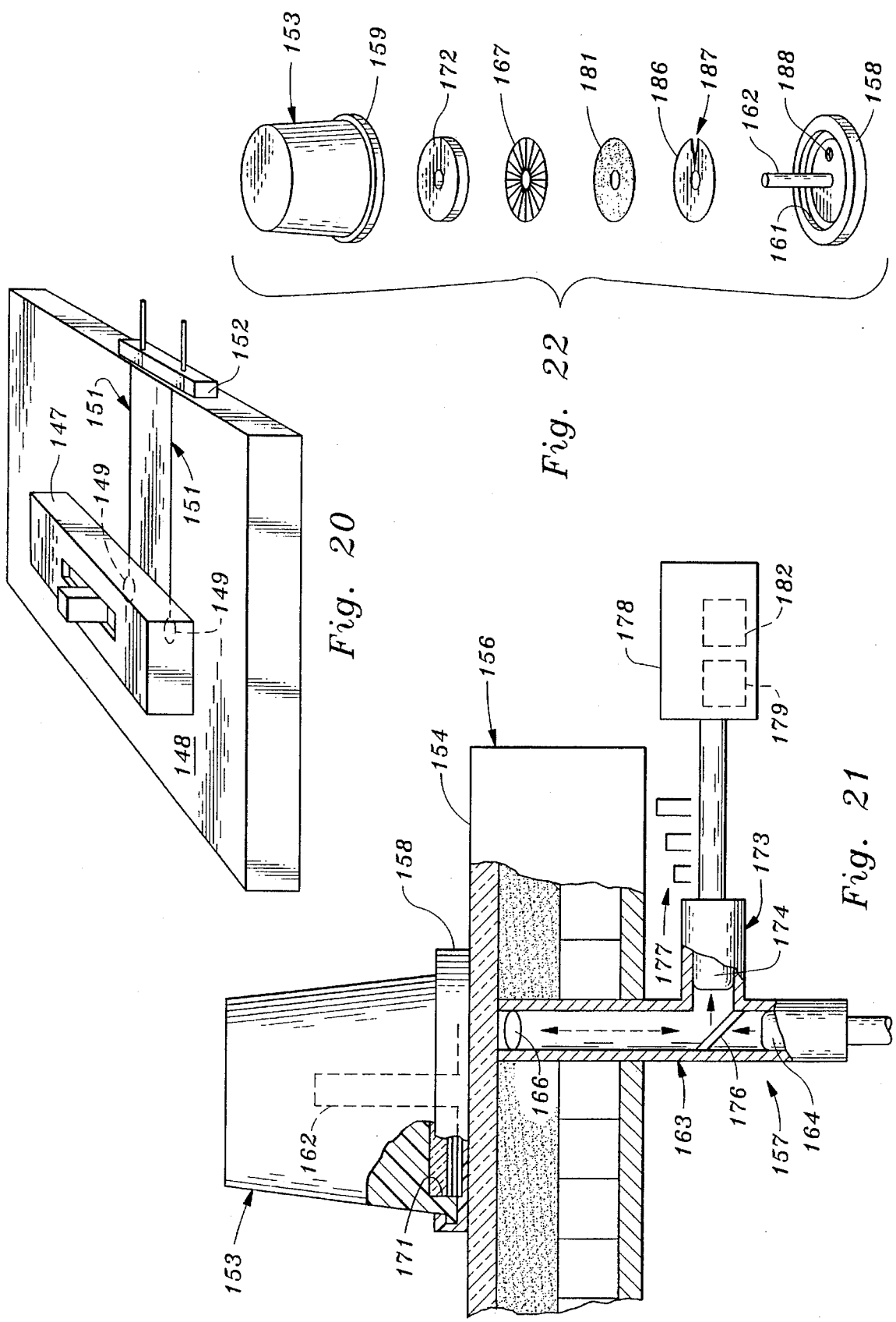

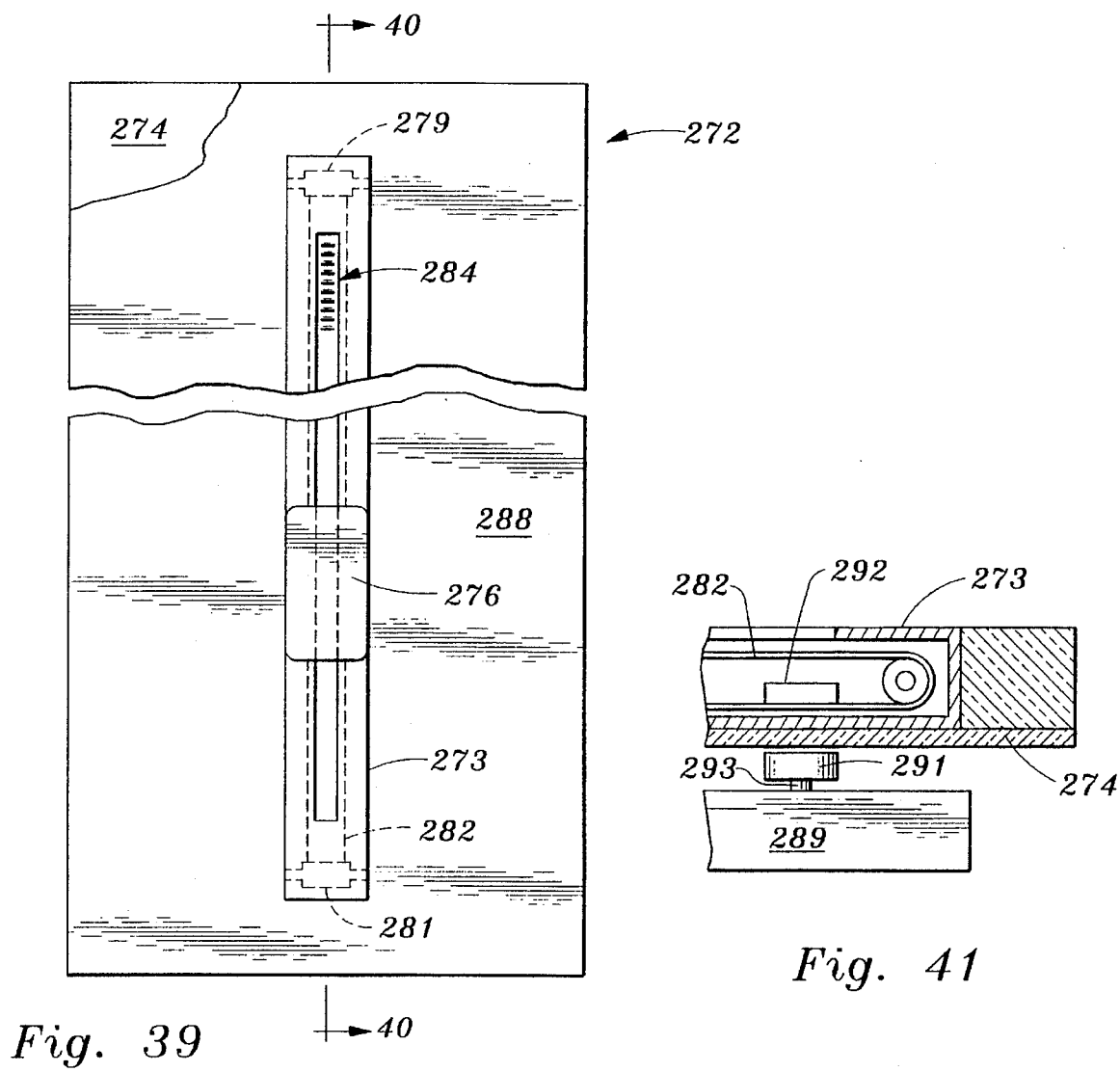
Fig. 39
Fig. 41
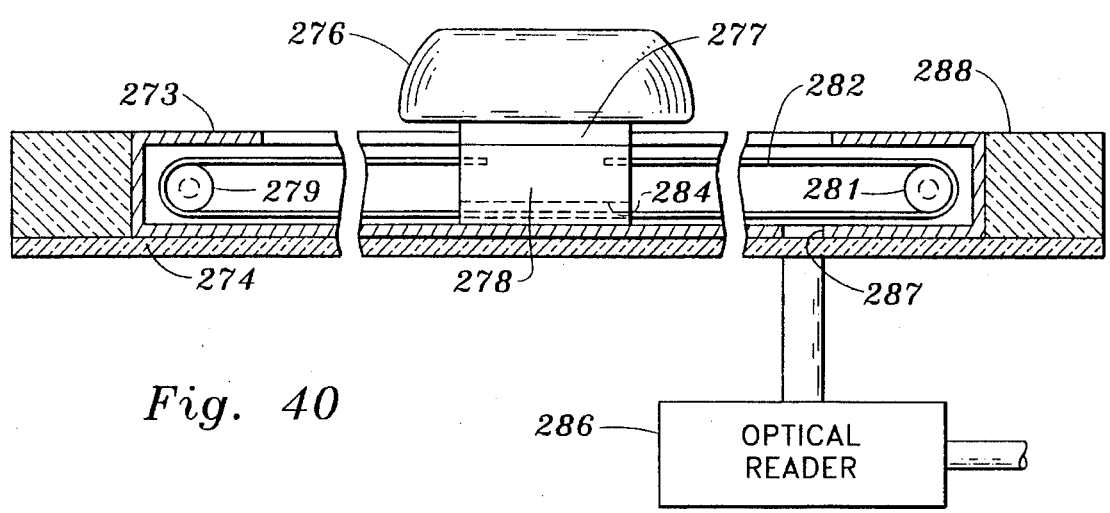
Fig. 40

OPERATOR/CIRCUIT INTERFACE WITH INTEGRATED DISPLAY SCREEN

CROSS REFERENCE TO RELATED APPLICATION

This is a continuation of application Ser. No. 08/225,782 having the same title and which was filed on Apr. 11, 1994 now abandoned, the application being a continuation-in-part of application Ser. No. 08/147,545 which was filed on Nov. 5, 1993 now abandoned.

TECHNICAL FIELD

This invention relates to apparatus for enabling operator interaction with electrical systems and more particularly to apparatus of this kind which includes a display screen that visually conveys information to an operator or user of the apparatus.

BACKGROUND OF THE INVENTION

Operators of certain types of electrical apparatus manipulate a different switch button, key, rotary knob or the like to control each different function of the apparatus. Traditional controls of this kind are convenient to operate and provide fast response to operator input. As such controls are single function devices, identifying labels, settings location symbols, calibration marks and other graphics are permanent markings situated adjacent to or on the controls.

Increasingly, electromechanical controls of the single function kind are being replaced with multiple function controls in which the operator uses a single device to initiate or control a number of different operations. Visual symbols and other graphics that may be needed by the operator in order to utilize the control are presented on a display screen which is situated in the vicinity of the control. The graphics can be changed instantly to enable use of the same control for different purposes. A control of this kind can replace a large number of specialized single function controls and can in fact have virtually unlimited functional flexibility. The keyboard keys, mouse or trackball and video display screen which interface a computer and the user of the computer are an example of multiple function controls of this kind.

Prior multiple function controls of the above described kind have disadvantages that are not experienced by operators of traditional single function controls although this has not been widely recognized. Prior multiple function controls require more complex and prolonged hand movements on the part of the operator and are less comfortable to operate at least for most users.

While the present invention is not limited to use with computers, consideration of the current interfacing of a computer and the operator is illustrative of problems which are inherent in prior multiple function controls.

Much of the operator input to a computer is effected with a mouse or trackball and the computer screen. The following sequence of hand manipulations is required to select a single "pop up" window on a computer screen and then make a selection within that window:

(a) The hand is moved to grasp the mouse or trackball.

(b) Additional hand movement travels the screen cursor to a selected spot on the screen.

(c) Finger movement at the mouse or trackball switch clicks the device to select that specific spot.

(d) Further hand movement travels the cursor to a new spot on the screen within the pop up window.

(e) Further finger movement at the mouse or track-ball makes the selection from the window.

Clearly it would be faster and less taxing to just turn a knob and/or push a switch to make such selections. Complex software, such as four color graphics and picture generation or music sound design and sequencer software, forces the operator to make hundreds or thousands of "clicks and drags" of the mouse or trackball in order to run a single program.

Pushing a switch or turning a knob feels right because it is familiar, it works fast and it satisfies the human mind's natural sensory perceptions. Thus it would be advantageous if multiple function controls gave the operator the immediate response and familiar tactile feel of traditional single function control mechanisms.

Prior efforts to accomplish this have significant limitations. Switch buttons have been positioned adjacent to the perimeters of liquid crystal displays or cathode ray tube screens. The display or screen is then used to create temporary labels which identify the current function of each switch. The visible image areas of the displays or screens are smaller than the total areas of the faces of the devices owing to the presence of thick structural framing, seals and/or bus conductors at the peripheral regions of the devices. Consequently, labels which appear on the screen are located a distance away from the switches which the labels identify. Typically, the label is 5/8 of an inch to 3/4 of an inch away from the switch. This makes it less easy to identify a particular label with a particular switch and increases the possibility of operator error. It is also not possible to situate graphics, such as radial lines or other control setting indicators, at any location around the periphery of a control as is often desirable.

Touch screens, utilizing infrared beams or the like, of the type used as control panels for industrial computer screens or in kiosks in stores, malls, banks or hotels, for example, can also be configured as multiple function controls but also have undesirable characteristics. The response time of touch screens is slow at best. It is often necessary to touch the screen two or three times to enter instructions or data. The feel of a touch screen is not a satisfactory tactile experience for many operators.

The present invention is directed to overcoming one or more of the problems discussed above.

SUMMARY OF THE INVENTION

In one aspect of the present invention, operator and electrical circuit interfacing apparatus has at least one circuit component which enables operator interaction with the circuit and has an electrically controlled display screen. Control means generate any of a plurality of different images at an image display area of the screen. At least a portion of the circuit component is situated at the screen within the image display area. The control means generates an image on the screen that conveys information pertaining to the operation of the circuit component.

In another aspect of the invention, the control means generates the image at a location on the screen that is adjacent to the circuit component.

In another aspect of the invention, the control means enables display of different information pertaining to the component at different times at the same location adjacent to the component.

In another aspect of the invention, at least one opening extends into the image display area of the screen and at least a portion of the circuit component is situated within the opening. The circuit component has a control member which can be moved from a first position to at least one other position to alter an electrical characteristic of the component which control member extends outward from the screen.

In another aspect of the invention, sensor means detect movement of the control member and the sensor means may be behind the screen.

In another aspect of the invention, apparatus for enabling manual control of electrical equipment has a plurality of operator actuated components each having a component housing and an actuator which extends from the the housing and which can be moved from a first position to at least one other position to alter operation of the equipment. The apparatus further includes a control panel formed at least in part by a flat panel display having an image area at which visible images can be displayed. A plurality of spaced apart openings extend into the display at locations which are within the image area. The component housings are situated behind the image area and the actuators of the components extend through the openings in the image area. Control means generate visible images at the image area at locations which are in proximity to the actuators which images convey information pertaining to operation of the components.

In another aspect of the invention, an electromechanical switch has a movable switch cap which may be depressed by an operator to operate the switch. The switch further includes a flat panel display with a display screen having an image area at which visible images may be generated, the flat panel display being embedded in the switch cap. Control means enable display of an image on the screen which conveys information pertaining to use of the switch. The image area of the screen is substantially coextensive with the end surface of the cap.

In another aspect, the invention provides a radio of the kind having a plurality of station selector switches each having a button which may be depressed to select a particular station. Each of the buttons has a flat panel display screen forming at least a portion of the front surface of the button. Display control means cause each of the screens to display changeable indicia that identify the station that is selected by depression of the particular button.

In a further aspect of the invention, a keyboard for connection to data processing apparatus has a plurality of keys which may be selectively depressed to initiate different operations within the data processing apparatus. The keys include at least one multiple function key which is usable to initiate any of a plurality of different operations within the data processing apparatus. A flat panel display is embedded in the multiple function key for displaying different images which identify the different functions of the key. Display control means cause the flat panel display to display a first of the images when the multiple function key is to be used to initiate a first of the operations and causes the flat panel display to display a second of the images when the multiple function key is to be used to initiate a second of the operations.

In still a further aspect, the invention provides operator and electrical circuit interfacing apparatus having a push button switch with a switch cap which is depressed to operate the switch and having a flat panel display screen and control means for generating an image on the screen that conveys information pertaining to the switch. The switch housing is secured to the screen at a location which is at least partially within the image display area of the screen. The switch cap is engaged with the housing and is supported thereby. A resilient element in said housing resists depression of the switch cap. A radiant energy generating device is disposed behind the screen in position to direct radiant energy along a path which extends through the screen and into the switch housing and switch cap. A translatable member in the switch cap has a radiant energy reflective surface, the member being movable between a first position at which the reflective surface is withdrawn from the radiant energy path and a second position at which the reflective surface is situated in the radiant energy path. The switch further includes means for shifting the member from one of its positions to the other thereof in response to depression of the switch cap and for returning the member to the original position in response to release of the switch cap. A radiant energy detector is disposed behind the screen in position to detect radiant energy which is reflected by the reflective surface.

The invention enables use of familiar electromechanical control devices such as keys, switch buttons, rotary knobs and the like in contexts where symbols, markings or other graphics need to be present in close proximity to the devices and need to be instantly changed to accommodate to different operations or stages of operation. Manipulation of traditional controls of this kind is uncomplicated, can be effected quickly and is appealing to the operator from the tactile or sensory standpoint. In one form of the invention, the control devices extend through openings within the image area of one or more electrically controlled display screens which provide the changeable graphics. In another form of the invention, movements and/or settings of control actuators that are secured to the face of a flat panel display are detected by optical or magnetic sensors which may be located behind the screen. In still another form of the invention, the changeable graphics are presented at a display screen which forms the end surface of a switch button, keyboard key or other similar control device. Singly or in groups, the functionally flexible controls may be used in conjunction with diverse types of electrical apparatus of which computer terminals, appliance control panels and MIDI keyboard controllers are among many other examples.

The invention, together with further aspects and advantages thereof, may be further understood by reference to the following description of the preferred embodiments and by reference to the accompanying drawings.

BRIEF DESCRIPTION OF THE DRAWINGS

FIG. 1 is a frontal view of a portion of a control panel or console having a series of different manually operated devices for controlling electrical systems or for inputting data to such systems.

FIG. 2 is a section view taken along line 2—2 of FIG. 1.

FIG. 4 is an enlarged view of the portion of FIG. 2 encircled by dashed line 4 in FIG. 2.

FIG. 5 is an enlarged view of the portion of FIG. 2 encircled by dashed line 5 in FIG. 2.

FIG. 6 is an exploded perpective view of a corner region of a flat display panel component of the apparatus of the preceding figures.

FIG. 7 is diagrammatic depiction of bus bar routing within the display panel of FIG. 6.

FIG. 8 is a diagrammatic depiction of an alternate form of bus bar routing within the display panel.

FIG. 9 is a frontal view of another control panel having another form of manually operated control which undergoes sliding movement.

FIG. 11A and 11B depict opposite faces of the screen of a flat panel display illustrating another construction for routing bus bar conductors when an opening is present in the screen.

FIG. 12 is a frontal view of still another control panel having banks of key operated switches suitable for operating complex digital systems and which includes a modular array of display panels.

FIG. 16 is a frontal view of still another control console embodying the invention which can be used for window selection and item selection at a computer terminal without requiring manipulation of a mouse or trackball.

FIG. 17B is another depiction of the computer system of FIG. 17A showing an example of changed graphics at the multiple function keys of the keyboard.

FIG. 20 is a perspective view of an integrated control switch and flat panel display in accordance with another embodiment of the invention.

FIG. 21 is a broken out side view of another integrated control switch and flat panel display embodying the invention in which settings of the switch are optically sensed by components behind the display screen.

FIG. 22 is an exploded perspective view of switch housing and switch cap components of the embodiment of FIG. 21.

FIG. 39 is a foreshortened top view of a modification of the apparatus of FIGS. 36 to 38.

FIG. 40 is a foreshortened section view taken along line 40-40 of FIG. 39.

FIG. 41 is a section view illustrating a modification of the embodiment of FIGS. 39 and 40 in which movement of the control member is sensed by magnetic means rather than optical means.

DETAILED DESCRIPTION OF THE PREFERRED EMBODIMENTS

Figure 3:
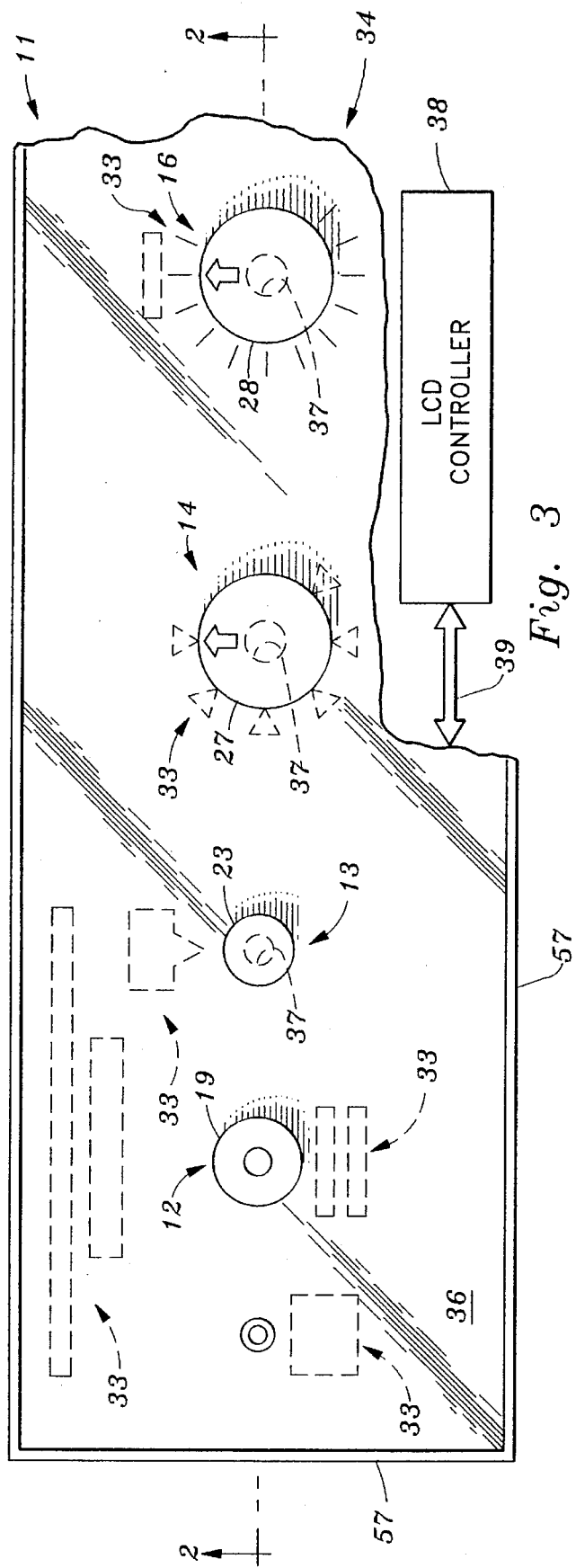
FIG. 3 is another frontal view of the control console that is generally similar to FIG. 1 except that the console is now displaying different graphics.

The invention is adaptable to single devices for enabling operator interaction with electrical apparatus and also to control panels or consoles having a plurality of electromechanical controls or data input devices. For purposes of example, FIGS. 1 and 2 depict a portion of a control panel 11 which supports four such devices 12, 13, 14 and 16. In this embodiment, device 12 is a switch of the type having an axially translatable shaft 17 that protrudes from a switch housing 18 and which is operated by manually depressing a switch cap or button 19 on the end of the shaft. Device 13 is a functionally similar switch having a housing 21, shaft 22 and depressible cap 23. Device 14 is a rotary encoder of the type having a housing 24, a protruding shaft 26 and a control knob 27 at the end of the shaft. Encoder 13 produces a multi-bit digital signal encoding a value which may be selected by the operator by turning control knob 27. Device 16 is a potentiometer of the type which produces a voltage having a magnitude that is selectable by turning a knob 28 situated at the end of a shaft 29 that protrudes from the potentiometer housing 31.

Devices 12, 13, 14 and 16 may be of conventional construction except as will hereinafter be described. Terminals 32 at the housing of each such device enable connection of the device to an electrical circuit for any of the purposes that such devices are customarily used. The switches 12, 13, encoder 14 and potentiometer 16 are illustrative of the types of electromechanical control device to which the invention is applicable and it should be recognized that the invention is also applicable to other forms of electromechanical control device.

Control devices, such as switches 12, 13, encoder 14 and potentiometer 16, usually have visible graphics in the vicinity of and/or on the device. Such graphics may be words, letters, numbers, icons or other markings and variously serve to identify the function of the device, identify the different settings of the device, convey instructions or warnings or serve other purposes. Such graphics have traditionally been produced by printing, engraving, silk screening or other methods which create graphics that are permanent and which cannot be quickly changed.

The present invention enables instant changing of graphics 33 when a control device 12, 13, 14 or 16 is to be used for more than one function or where such changing is desirable for other purposes such as in the displaying of new setups. The invention further enables placement of changeable graphics 33 immediately adjacent to or in very close proximity to the device 12, 13, 14 or 16 to which the graphics relate. For this purpose, the devices 12, 13, 14 and 16 are integrated with an electrically controlled flat panel display 34 of the type which has a screen 36 at which changeable visible images are produced.

In this embodiment of the invention, the devices 12, 13, 14 and 16 extend through openings 37 in the screen 36. The actuators, such as switch cap 19 and rotary knobs 27 and 28, are situated directly in front of the screen 36 or, as in the case of switch cap 23, protrude from the screen. The housings 18, 21, 24 and 31 of devices 12, 13, 14 and 16 are behind the screen 36.

Screen 36 in this particular example of the invention is a liquid crystal display but may also be of any of the other known types of flat panel display that generate changeable images in response to signals received from a display controller 38 through a multi-conductor bus 39. The controller 38 may be of any of the known designs and in many cases is an internal component of a computer. Changing of the graphics 33 as depicted in FIG. 3 may variously be initiated by programming, by actuation of another device such as a code key on a keyboard (not shown) or in response to operation of the control device 12, 13, 14 or 16 with which the graphics are associated. The screen 36 may be either monochrome or one which produces multi-colored images.

Referring again to FIGS. 1 and 2, further components of the flat panel display 34 include an integrated circuit driver board 41 which receives the signals from the controller 38 and which may be of known circuit configuration. Driver board 41 is disposed behind screen 36 in spaced apart, parallel relationship with the screen. The housings 18, 21, 24 and 31 of the control devices 12, 13, 14 and 16 of this example are secured to driver board 41 and conductors 42 extend through the board to enable connections to be made to the terminals 32 of the devices.

Backlighting of the screen 36 is provided for by a backlight panel 43 disposed between the screen and driver board 41 in spaced apart relationship with each such component. The light panel 43 in this embodiment is a flat rectangular array of light emitting diodes 44 energized though conductors 46 which extend to the driver board 41. Other known light sources may be used, such as fiber optic cloth, fluorescent light tubes, incandescent or halogen light bulbs or the like. No backlighting is required if the screen 36 is of the electroluminescent type.

In this embodiment of the invention, the space between screen 36 and light panel 43 is filled with hardened plastic 47, such as epoxy for example, which adheres to the screen and which provides solid support and backing to the screen thereby preventing damage from external forces. At least a portion of the plastic 47 that is between light panel 43 and screen 36 is of the translucent type and serves as a light diffuser which distributes light evenly between the different areas of the screen. Alternately, plastic 47 may be clear epoxy or the like if a thin layer of light diffusing material is adhered to the screen 36.

Plastic framing 45 extends between the peripheral regions of driver board 41 and light panel 43 and components of the flat panel display 34 are unitized by screws 50 which extend through the driver board and light panel and engage in the body of plastic 47 which is situated between the board and screen 36.

Some types of display screen 36 are composed wholly of solid material like PDLC and thus the openings 37 can simply be drilled or stamped without concern about leakage although sealing of the material around the periphery of each opening may still be desirable to prevent infusion of moisture or other contaminants. Other types of display screen 36, such as the liquid crystal display screen of this example, contain a thin layer of liquid or semi-liquid material 51. Referring now to FIG. 4, the screen 36 includes two slightly spaced apart, parallel thin plates 48 and 49 formed of transparent plastic or glass and the liquid crystal material 51 is contained between the plates. The liquid crystal 51 may be of any of the known types such as polymer dispersed liquid crystal, cholesteric and the like. In other embodiments of the invention, the screen may be of the reflective or direct view type which does not require backlighting.

Leakage of the material 51 at the perimeter of the screen 36 is prevented by an outer edge seal 52 which may be a band of epoxy plastic or the like that extends around the perimeter of the screen between the edges of plates 48 and 49. Referring to FIG. 5, similar bands of epoxy or the like extend around the openings 37 in screen 36, between adjacent edges of plates 48 and 49 and thus form internal edge seals 53.

In some applications of the invention, it is preferable or in some cases necessary that the edge seals 52 and/or 53 be very thin as the areas of the screen 36 at which the seals are located are unusable for the purpose of displaying images. Referring jointly to FIGS. 1 to 5, very thin outer edge seals 52 enable the usable image area of the 36 to be substantially coextensive with the outline of the flat panel display 34 as a whole. This maximizes the space available for changeable graphics. It also enables disposition of two or more of the flat panel displays 34 in side by side and/or end to end relationship to form what appears to be a single continuous display screen in a manner which will hereinafter be described in more detail.

Very narrow internal edge seals 53 are appropriate in instances, such as at control device 13, where the component 23 that extends from the surface of the screen 36 has transverse dimensions that are slightly less than the transverse dimensions of the screen opening 37 through which the component extends. Very narrow internal edge seals 53 enable graphics to be displayed in very close proximity to the component such as switch cap 23. Referring to FIG. 2, this result can be achieved with wider edge seals 53 in instances, such as at potentiometer knob 28, where the knob, switch cap or the like is sizably larger than the underlying screen opening 37 and overlaps a sizable portion of the screen around the perimeter of the opening.

Current technology enables formation of edge seals having widths ranging down to about 0,005 inch.

Referring to FIG. 6, this particular example of the invention uses a screen 36 having a bus bar structure of the type used in multiplexed liquid crystal displays. Images are produced at the screen 36 by applying an electrical field across the liquid crystal material 51 or the like at appropriate points or image pixels as dictated by the configuration of the image that is to be produced. To apply the field, a first series of parallel bus bar conductors 54 extend across the surface of the outer screen plate 48 that faces liquid crystal 51. A second set of such conductors 56 extend across the surface of the inner screen plate 49 that faces the liquid crystal 51, conductors 56 being in orthogonal relationship with conductors 54. Thus, as is understood in the art, an electrical field may be applied across any particular point or pixel within the image area by applying a voltage difference to the particular conductor 54 and the particular conductor 56 that cross each other at the location of the particular point. Conductors 54 and 56 are preferably formed of a transparent conductive material such as indium tin oxide.

In flat panel displays of the active matrix type both sets of bus bar conductors are located at the same side of the electro-optically active material with thin film insulation being situated between the X and Y bus bars. It should be understood that active matrix displays of this type may be used in the practice of the present invention.

In most prior flat panel displays, electrical connections to the bus bar conductors extend along the margins of the screen and cause a sizable marginal region of the screen to be unusable for image display purposes. Screen constructions of that kind are suitable for some applications of the present invention while in others the image area should be coextensive with the screen. In instances where the image area is to extend substantially to the edges of the screen as described above, the bus bar conductors can extend to the edges of the plates 48 and 49 and then be angled to run transversely across the edge of the plate as shown at 54a and 56a in FIG. 6. Thin, flat connectors 57, which are preferably formed of flexible insulative material, have edges abutted against the edges of plates 48 and 49 and have spaced apart conductors 58 which contact the bus bar conductors 54a and 56a to create permanent low resistance connections. Connectors 57 extend to driver board 41 as shown in FIG. 2 to interconnect the bus bar conductors and driver board through permanent low resistance connections.

For clarity of illustration, connectors 57 are depicted in FIGS. 1 and 2 with a greater thickness than is necessarily required. Using photolithic techniques, such connectors can be fabricated with thicknesses ranging down to 0.001 inch.

Referring to FIG. 7, the presence of openings 37 in the image area of screen 36 would create a discontinuity in one or more of the bus bar conductors such as conductors 54 unless arrangements are made to maintain continuity. If the conductors 54 are addressed, i.e. receive their voltages, at one end only then the openings 37 would create blank regions in the image area between the openings and the far edges of the screen 36. This can be avoided by addressing the conductors 54 at both ends. It is still preferable to provide a continuous conductive path between the ends of each conductor 54. Otherwise, the presence of a non-conductive flaw at some point along the conductor causes a possibly lengthy segment of the conductor, located between the flaw and the opening 37, to be unenergized. This degrades image quality much more severely than if only the pixel at the site of the flaw is blanked out.

FIG. 7 depicts one technique for maintaining continuity of the conductors 54 which are directed towards an opening 37. In particular, the conductors 54 are curved or angled to extend along the portions of plate 48 that are immediately adjacent to the opening 37 and to resume their original alignments at the opposite side of the opening.

The area of the screen 36 at which the conductors 54 are routed around the margin of an opening 37 is unusable for image depiction. To minimize the size of this area, the spacing of the conductors 54 may be reduced at such areas and if necessary the width of the conductors may be reduced at those areas. In practice, the number of conductors 54 is much greater than can be clearly depicted in FIG. 7 and conductor spacing is much smaller than can be depicted. If, for example, there are 100 conductors per inch of plate 48 surface and opening 37 has a diameter of one inch, then 100 conductors must be routed around the opening. Using known photolithographic techniques, the spacing of the conductors as they pass around opening 37 can be reduced to 5 microns. The unusable area of the screen adjacent opening 37 is then only about 0.5 millimeters wide. Thus the unusable area does not have any significant effect with regard to locating graphics in close proximity to the opening 37.

FIG. 8, which is a view of the underside of plate 48 of FIG. 6, depicts another technique for maintaining electrical continuity of the conductors 54. Each conductor 54 which is directed towards an opening 37 is angled to extend through the opening at the wall thereof as indicated at 54b. The conductor is then routed around the opening 37 at the opposite surface of plate 48 as indicated at 54c. At the opposite side of opening 37, the conductor extends back through the opening as indicated at 54d and then resumes its original course as indicated at 54e. Spacing and width of the portions 54c of the conductors that are at the opposite surface of plate 48 are not usually of particular concern as these portions of the conductors are away from the liquid crystal and do not interfere with image display.

The conductors 54 are preferably made of a transparent material such as indium tin oxide.

Referring again to FIGS. 1 and 2, components other than electromechanical control devices can also be embedded in the screen 36 such as, for example, a light emitting diode 61 may be embedded at another sealed opening 37 to indicate that a device is on or off or for other purposes. Similar light emitting diodes 62 may be embedded in the switch caps, knobs or the like of control devices 12, 13, 14, 16 such as is shown at switch cap 19 of switch 12. For this purpose, the shaft 17 to which the switch cap 19 is secured may be hollow. This enables the lead wires 63 to extend through the screen 36 for connection to driver board 41 or some other component.

Switch buttons or caps 19 of the type which are moved in the direction of the screen 36 during operation preferably have an annular cushion 64 of resilient foam rubber or the like disposed between the switch cap and the screen. In the case of switch caps 23 that extend into the screen 36, a conforming recess 66 may be provided in the underlying translucent material 47 to receive the cap and another resilient cushion 67 may be disposed between the cap and the base of the recess.

Figure 10:
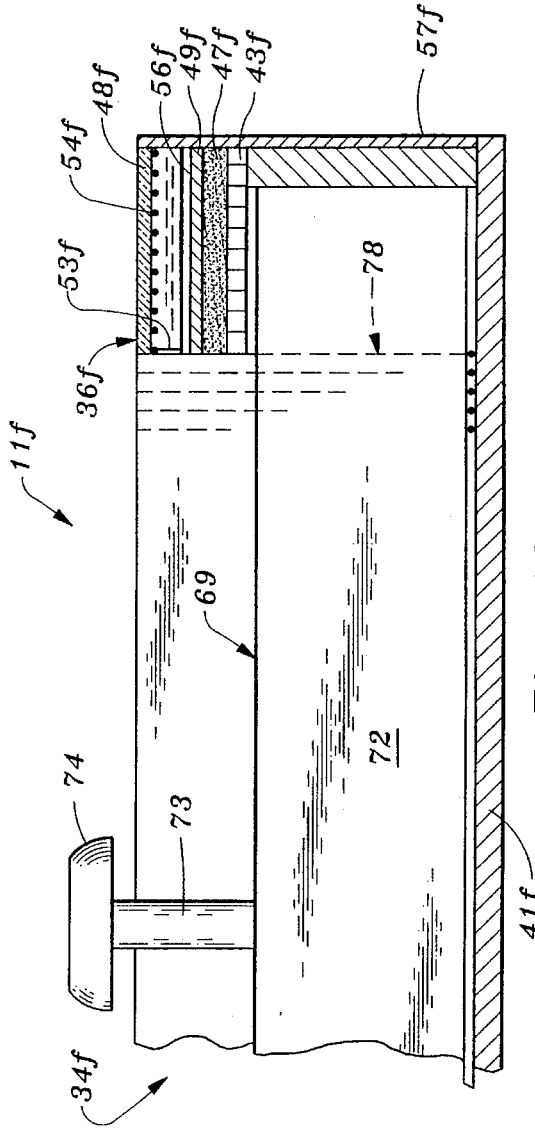
FIG. 10 is a partial cross section view of the apparatus of FIG. 9 taken along line 10—10 thereof.
Figure 11:
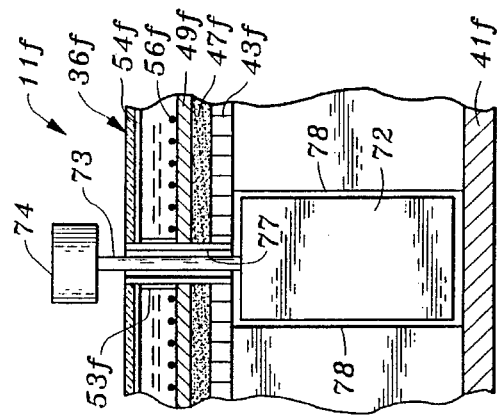
FIG. 11 is a partial section view of the apparatus of FIG. 9 taken along line 11—11 thereof.

FIGS. 9 and 10 and 11 depict another control system 11f having a series of faders 69 of the type used to vary sound volume in digital or analog systems 71 of the known type which synthesize or otherwise process music or other sound. Each fader 69, which may be of known construction, has an elongated housing 72 from which a translatable shaft 73 extends at right angles to the housing. Shaft 73 carries an end cap 74 which is manipulated by the operator to slide the cap and shaft along housing 72 in in order to select a sound amplitude or to vary the amplitude. A scale 76 of spaced apart lines is situated adjacent the path of travel of cap 74 and is usually calibrated in terms of decibels.

Control system 11f includes a flat panel display 34f that may be similar to the previously described panel display of FIGS. 1 to 8 except as herein described. Thus, with reference again to FIGS. 9, 10 and 11, the face of control system 11f is defined by a screen 36f of the flat panel display 34f. Display 34f further includes a diode back-light panel 43f, driver board 41f with connectors 57f which extend to the edges of the screen, and a filling 47f of translucent epoxy or the like which serves as a light diffuser, such components being arranged and interconnected in the manner previously described. Fader housings 72 are disposed within panel display 34f between the back-light panel 43f and driver board 41f. The translatable shaft 73 of each fader 69 extends through a thin elongated slot 77 in screen 36f and back-light panel 43f and protrudes from the face of the screen.

The internal edges of the screen 36f that bound the slot openings 77 have narrow edge seals 53f of the previously described kind. Bus bar connectors 54f and 56f that are directed towards the slot 37f are made electrically continuous as has also been previously described. Routing of the bus bar conductors 54f around the slot 77 in the manner shown in FIG. 7 may in some instances create an undesirably wide zone at which graphics cannot be displayed owing to the large number of such conductors that are intercepted by the lengthy slot. In such cases, the bus bar conductor 54f interconnections may be made through thin, multi-conductor, flexible connectors 78 which extend down from each side of the slot 77 and around the fader housing 72 as shown in FIG. 11. The two connectors 78 are permanently heat seal bonded together below housing 72 to maintain coherent bus bar continuity. The other set of bus bars 56f, which intercept the narrow ends of slot 77, may be routed along the edges of the adjacent plate 49f in the manner which has been previously described.

If the bus bar conductors 54f are routed around the slot 77 in the manner previously described with reference to FIG. 8, rather than by using the flexible connectors 78, the conductors have differing lengths and thus different electrical resistances. This may detract from picture quality in instances where there is a large variation in the resistances of the conductors. This may be counteracted in the manner depicted in FIGS. 11A and 11B which show opposite faces of plate 49f. In particular, the portions 75 of conductors 54f which extend around slot 77 at the face of the plate 49f that is away from the liquid crystal material may have different widths and/or thicknesses which are dependent on the length of the particular conductor portion 75 and which are selected to equalize the electrical resistances of the conductor portions. In this example, progressively longer ones of the conductor portions 75 have progressively greater widths.

Referring again to FIGS. 9, 10 and 11, the plates 48f and 49f of screen 36f of this embodiment are formed of transparent plastic as glass can be susceptible to breakage when a long opening 77 extends into proximity to one or more edges of the screen.

The faders are coupled to a computer 80, which controls the sound processer 71, through an analog to digital signal converter 85 or a digitally controlled attenuator as found in a series ten recording console. The computer 80 maybe operated with known recording console automation software such as SSL, Neve or Series Ten with slight modifications to enable the display controller 38f to address screen 36f and provide the desired graphics.

Embedding of faders 69 in the panel display 34f enables display of changeable graphics, such as scales 76, at locations adjacent the path of travel of the slidable caps 74 as well as at other locations in the adjacent area. This can greatly enhance operation of digital or analog sound processors 71. The display controller 38f of the system may instantly change the scale 76 enabling use of a fader 69 to control different ranges of sound amplitude. For instance, a scale 76 showing the standard infinity to 0 dB to +6 dB or +10dB may be changed to one showing ½ dB ¼ dB steps over a much smaller range, such as a 2 dB range, for example. Computer 80 can be programmed to automatically change the fader scale 76 based upon how fast the operator moves the cap 74. With fast movement, the scale may be the above described standard one. With slower motion, the resolution of the scale may be increased thereby enabling extremely precise operator control of the fader 69.

Recording consoles commonly have light emitting diodes or the like which indicate various conditions such as the overall automation mode and automation update conditions, for example. These can be eliminated if the control system 11f has a full color screen 36f which can emulate the diodes by displaying LED simulations 81 on screen 36f which are accompanied by displays 82 that identify the functions of the LED simulations. Computer 80 can be programmed to cause the simulations 81 to strobe, pulsate, flicker or stay lit to indicate different automation states and to enable the operator to change the size, shape, color and location of the simulations on screen 36f. Visual information 33f such as labels, notes, icons, pictures, real time video and written descriptions and the like can also be presented on the screen Referring to FIG. 12, a control system 11g having a bank of 32 button operated switches 13g of the previously described kind embedded in a display screen 36g may control 32 digital tracks of direct-to-disk recording for digital sequencing. By changing the labeling 83 of the switches 13g at screen 36g, the same switches may be used to provide 32 different cue storage points for locating positions within the recorder.

Control system 11g has a modular construction in which multiple flat panel displays 34g of the hereinbefore described kind are disposed in side by side and end to end relationship which permits these separate screens to appear as a continuous display screen 36g. This is made possible by the previously described very thin seals at the edges of the screens of each module and by the previously described thin connectors which energize the bus bar conductors at the edges of the screens. Use of the modular construction provides for a shorter addressing time than can be realized with a large continuous screen. The seals and connectors can be made sufficiently thin to maintain conformity of image pixel spacing across the boundary of adjacent panel displays 34g although this is not essential in all instances. The panels may be spaced apart by distances of approximately 10 to 20 mils, for example.

FIG. 16 depicts a control system 11h embodying the invention which may be coupled to a computer 84 that includes a display control board. The control system 11h enables selection of pop up windows and selection of items within the windows without the use of a mouse or trackball.

Control system 11h has a button operated switch 13 and a rotary encoder 14 of the previously described kinds which are embedded in a flat panel display 34h in the manner which has also been previously described. The screen 36h of console 11h is of sufficient size to display computer generated graphics 33h of the kind that are customarily displayed on a video display terminal although it is preferable to rearrange the location of icons or the like to accommodate to the rotary movement of the encoder knob 27h. Display of the main menu is accompanied by display of lines 86 extending from locations around the periphery of encoder knob 27h to the several icons in the menu enabling turning of the knob to select a pop up window. The encoder 14h can generate a different digital signal byte at each setting of the knob that enables the computer to recognize the icon which has been selected. Depression of switch 13h transmits a signal to the computer that is equivalent to the clicking of a mouse or trackball and thus results in the replacement of the main menu graphics 33h with the graphics of the selected pop up window. Encoder knob 27h may then be turned to select a particular item from the window.

The console 11h may, if desired, have additional controls embedded in the flat panel display 34h that perform other functions similar to those of conventional controls that are associated with a computer terminal and the display may be used to provide changeable graphics for such controls.

Figure 14:
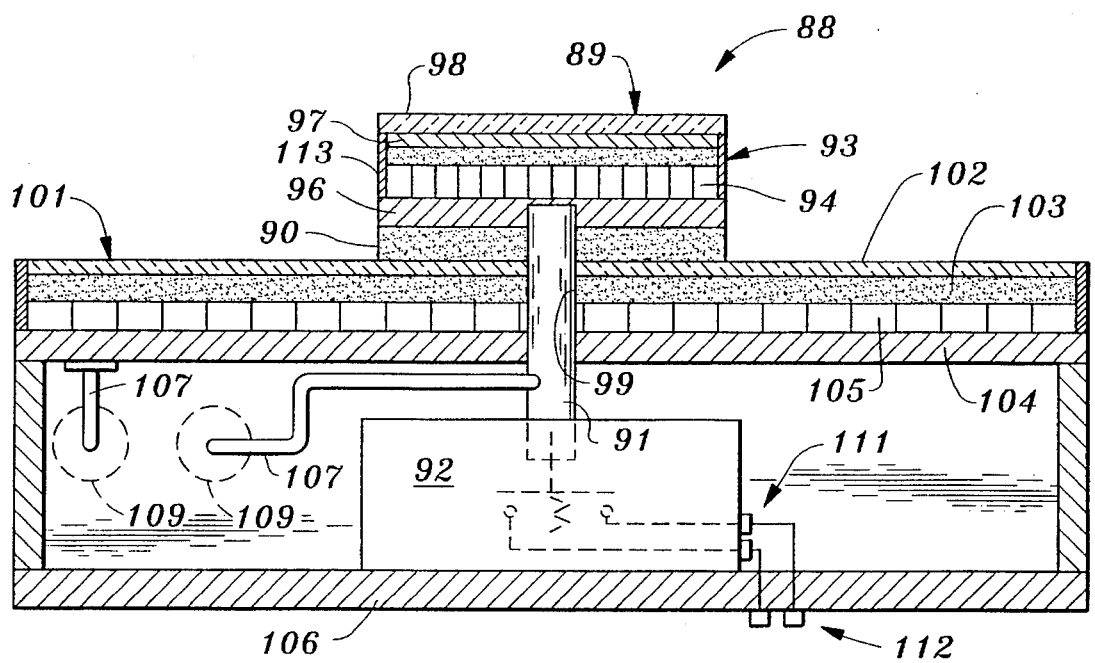
FIG. 14 is a cross section view taken along line 14—14 of FIG. 13.
Figure 13:
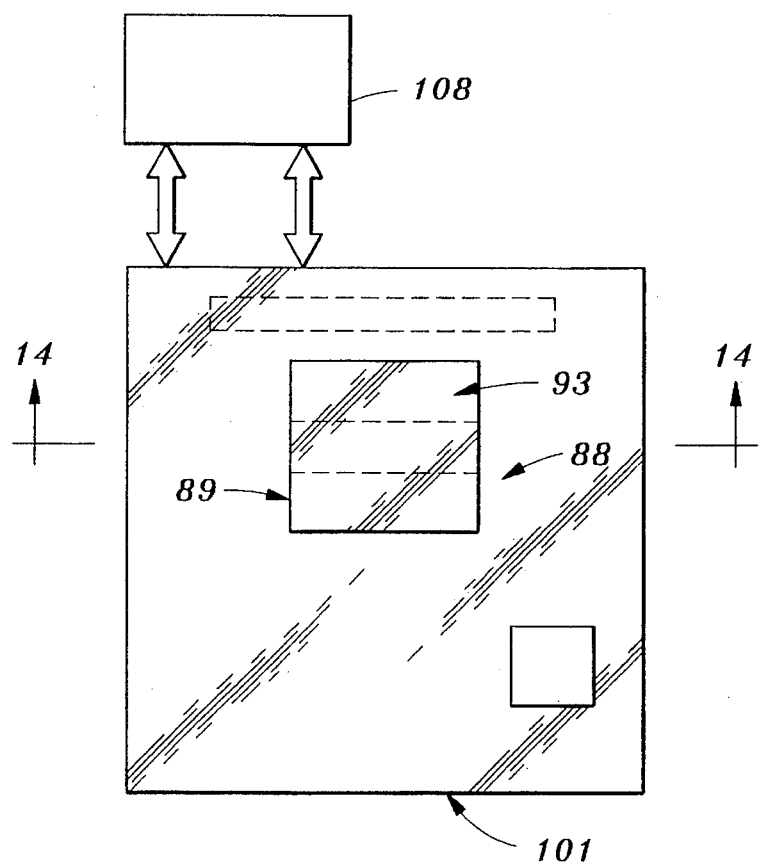
FIG. 13 is a frontal view of a switch box having a switch key with a first display panel embedded in a second and larger display panel.

Control devices which are embedded in a display screen to provide a control panel with changeable graphics may themselves be provided with an additional flat panel display. FIGS. 13 and 14 depict a switch 88 of the type having a depressable switch cap 89 at the end of an actuator shaft 91 that extends from the switch housing 92. The switch cap 89 is itself a panel display 93 of the hereinbefore described type except that the light panel 94 may be adjacent the driver board 96 as there are no control device components therebetween. The display screen 97 in the switch cap is overlain with a protective transparent cover 98.

Switch cap 89 is disposed in front of the screen 102 of another and larger flat panel display 101 that may also be similar to the previously described displays. The actuator shaft 91 to which cap 89 is secured protrudes from screen 102 through an opening 99 which extends completely through the screen 102, diffuser 103, light panel 105 and driver board 104 of the larger display 101 and the switch housing 92 is secured to the floor of a casing 106 that supports the larger display. Cap 89 is larger than the cross sectional area of opening 99 and thus overlaps an area of the larger display screen 102. The cap 89 is spaced from the screen and a volume 90 of compressible foam rubber or the like is situated between the cap and the screen. Flexible multi-conductor cables 107 in casing 106 enable control signals from the display controller 108 to be transmitted to the driver boards of each display through separate pin connectors 109 at the wall of the casing 106. The cable 107 which connects with the driver board 96 of switch cap 89 is routed through actuator shaft 91 which is of tubular construction. The switch terminals 111 at housing 92 are connected to external terminals 112 on the exterior of casing 106 to enable connection of the switch with apparatus which the switch controls.

The switch cap panel display 93 may be used to display words, symbols, icons, real time video or the like that identify the function of the switch 88 while the larger panel 101 displays other information that is useful to the operator. Both displays may be instantly changed when the switch 88 is used for different functions at different stages of operation of the controlled apparatus.

Figure 15:
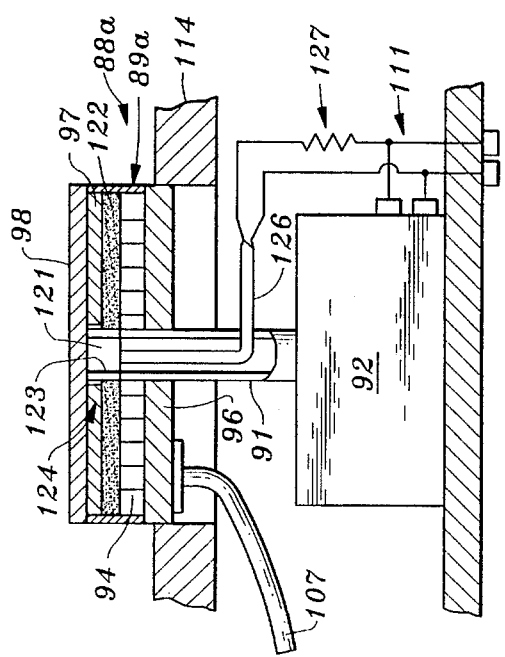
FIG. 15 is a section view of a key operated switch having a flat panel display embedded in the key cap.

Use of extremely thin flexible connectors 113 to address bus bar conductors at the edge surfaces of the switch cap screen 97 and use of very narrow edge seals as previously described enables the image area on the cap to be substantially coextensive with the cap itself. Referring to FIG. 15, a similar switch construction 88a is highly useful in contexts where the panel 114 behind the the switch is not another flat panel display that produces changeable images. Liquid crystal displays have heretofore been embedded in switch caps but a sizable portion of the marginal region of the screens has been occupied by thick edge seals and by bus bar connections. This has limited the available image area to one which is substantially smaller than the total area of switch cap face. This is a particularly severe disadvantage in the case of small switch caps. The types of display that have heretofore been embedded in switch caps would leave virtually no room for image display in a square cap measuring one half inch along each side.

Switches 88a having a full size image area in the switch cap 89a can be highly useful in a variety of contexts. For example, with reference to FIG. 17A, such switches 88a may be used to replace the permanently marked keycaps of an alphanumeric computer keyboard 116 or the like. Many computer programs require use of so called "soft keys" on the keyboard. Keys or combinations of keys are used for purposes other than typing in the letter, number or other symbol that is imprinted on the key. The operator must memorize which keys are involved in these non-typing functions. For example, a particular program may require that the "Z" key be pushed to initiate an "Undo" function as there is no key on the standard keyboard that is expressly dedicated to that function.

Figure 17A:
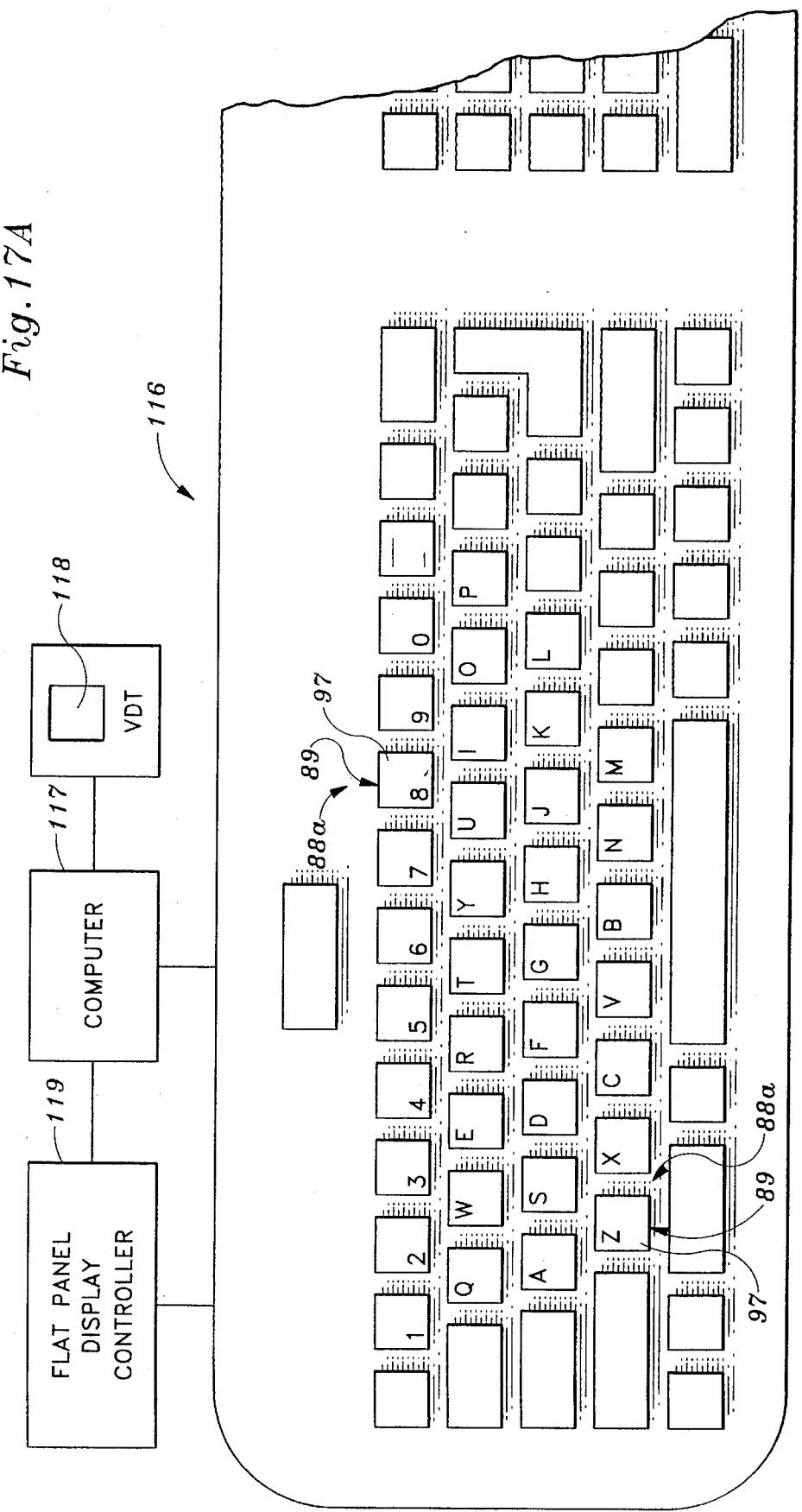
FIG. 17A depicts a computer system having a keyboard with graphics on certain multiple function keys that change when the functions of the keys change.

Replacing the permanently engraved keycaps with caps 89 having embedded large area display screens 97 enables the labelling of the keys to be changed automatically to display whatever function a program is calling for at a particular time. As shown in FIG. 17A, the caps 89 may display the standard alphanumeric characters at times when the computer 117 is conditioning the keyboard 116 for entry of alphanumeric data. As shown in FIG. 17B, the display at one or or more keys can be changed automatically in response to selection of a menu on the master computer screen 118. Luminosity of a key or group of keys can be changed to call attention to the key or keys.

In the example shown in FIGS. 17A and 17B, the particular keycaps 89 which are used to enter certain standard commands in a computer of the Mac System 7 (™) type are provided with embedded display screens for the above described purpose and icon selection keys are also provided with changeable displays. A display controller 119 generates the required graphics at such keycaps 89. The computer 117 may operate in the known manner using the known operating system and programming.

Using the techniques hereinbefore described, further circuit components can be embedded in the switch cap panel display. FIG. 15 depicts embedding of a light emitting diode 121 in the switch cap 89a. For this purpose, the actuator shaft 91 of the switch is hollow and extends through the driver board 96, light panel 94, a layer 122 of translucent material bonded to the back surface of the display screen 97 and the screen itself through a conforming opening 123 in such components. The end of the shaft 91 contacts the inside surface of the protective transparent cap cover 98. The edges of screen 97 which bound opening 123 have thin seals 124 of the previously described kind. Bus bar conductors (not shown in FIG. 15) that extend towards opening 123 are made electrically continuous by one of the techniques which have been previously described.

Light emitting diode 121 in this embodiment is situated within shaft 91 at a location adjacent the transparent switch cap cover 98. In an alternate construction, shaft 91 may extend through cover 98 and the diode 121 may protrude slightly from the outer surface of the cover to enhance visibility. Shaft 91 is preferably formed of opaque material so that light from the diode 121 does not detract from the quality of the images produced by screen 97. The thickness of the internal thin seals 124 can be increased slightly from what would otherwise be necessary to prevent diode light from entering the adjacent portion of the image area of the screen 97.

The light emitting diode 121 is energized through a two conductor electrical cord 126 which extends within shaft 91 and then out through the wall of the shaft to connect with the circuit which controls the diode. In the present example, cord 126 connects diode 121 across the output terminals 111 of switch 88a in series with a current limiting resistor 127 and thus the diode provides a visual indication of closing and opening of the switch. The diode 121 may be energized in response to any of various other operating conditions in the apparatus to which the switch 88a is connected by connecting cord 126 to other terminals in the circuit.

The flat panel display controllers which are a component of the above described embodiments of the invention may be of the known designs. Such controllers are available commercially along with instructions for programming desired graphics. As will be apparent from the foregoing, the graphics which are appropriate to different embodiments of the invention may take diverse different forms. One example of suitable software is presented at the end of this specification. This example causes alternating displays of the words "ON" and "OFF" adjacent a switch cap in response to successive depressions of the switch cap and thus is usable with the control switch of electrical devices of the type which turn on in response to a first operation of the switch and then turn off in response to the following operation of the switch.

It should be understood that the software for one specific application of the invention that follows this specification is for purposes of example. The software may take many other forms in other applications of the invention.

Figure 18A:
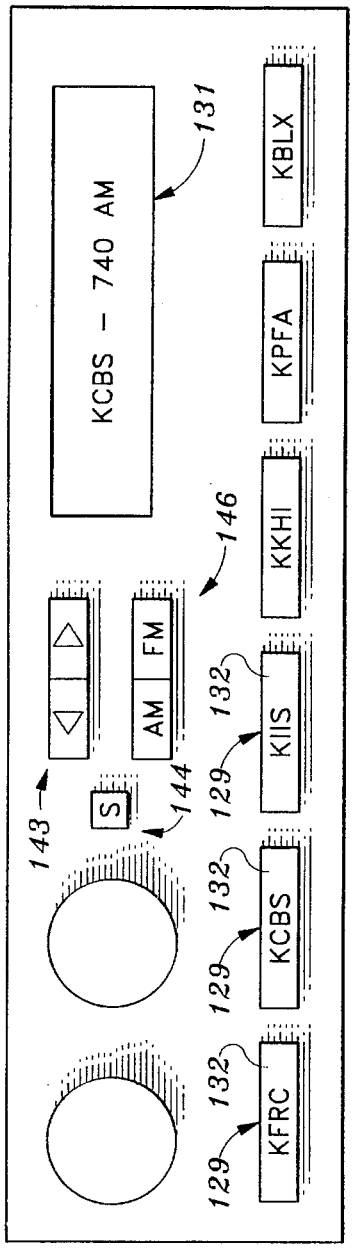
FIGS. 18A, 18B and 18C are frontal views of an automobile radio embodying the invention and illustrating changing graphics which are displayed under different conditions of operation.

Switches which have a flat panel display in the switch cap may be used in a variety of other devices. Referring to FIG. 18A for another example, automobile radios 128 typically have a row of programmable push button switches 129 which can be used to select specific broadcasting stations. Recent car radios 128 are also often equipped with a microprocessor controlled flat panel display 131 which displays information concerning the station to which the radio is tuned, such as the frequency at which the station broadcasts and whether it is AM or FM. This does not in and of itself indicate which switch 129 is to be operated to select a particular station. This information can be conveyed to the operator of the radio 128 by providing station selector switches 129 which have flat panel displays 132 at the front faces of the switch caps 133.

Figure 19:
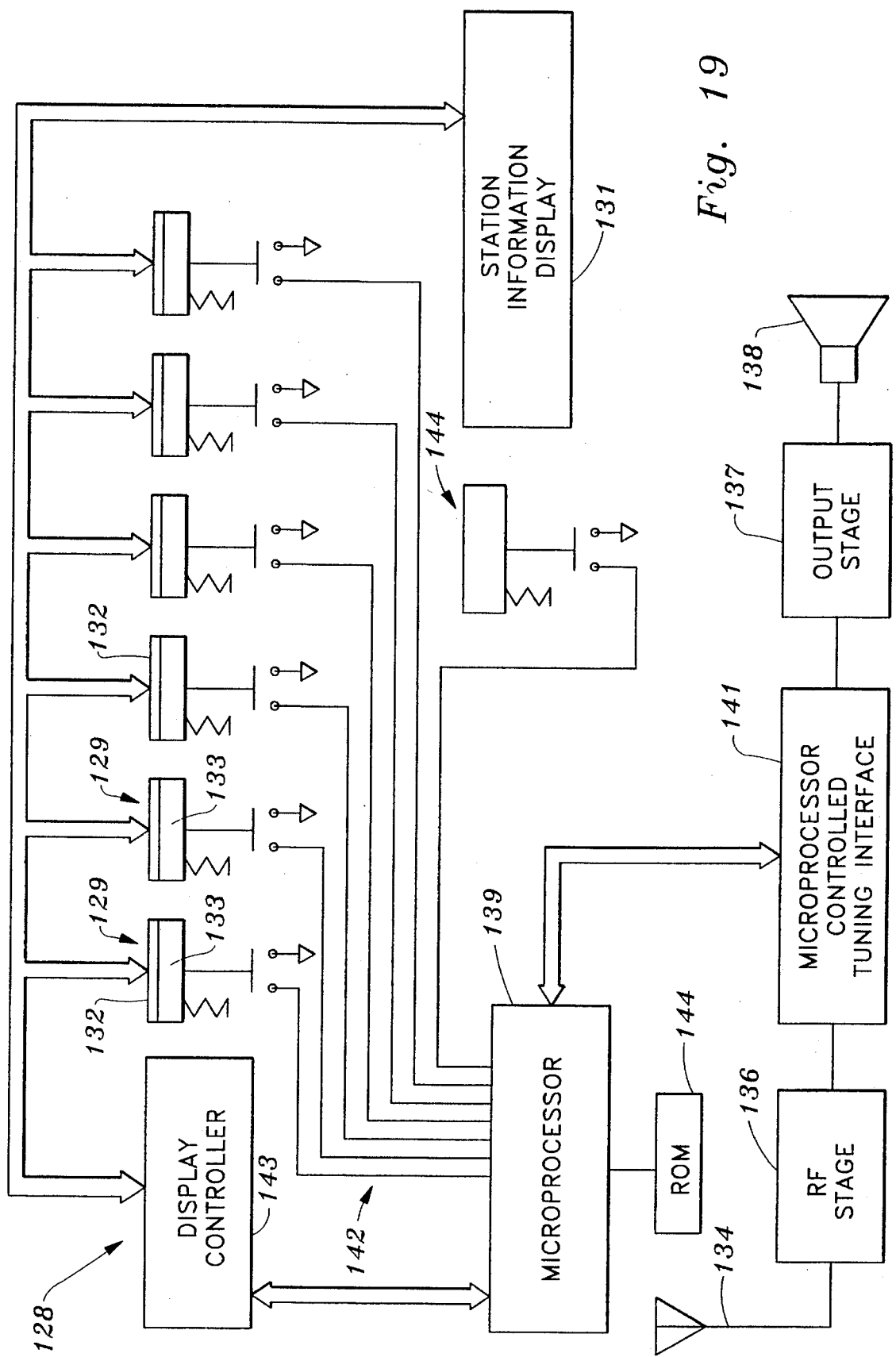
FIG. 19 is a schematic circuit diagram of the radio of FIGS. 18A, 18B and 18C.

The internal construction of the switches 129 may, if desired, be similar to that of the switch 88a hereinbefore described with reference to FIG. 15. Referring now to FIG. 19, the radio 128 may be of known design except as herein described. Thus the radio 128 may include a conventional antenna 134 coupled to an RF stage 136 which is itself coupled to an output stage 137 and speaker 138 through a microprocessor 139 controlled tuning interface 141. The microprocessor controlled tuning interface 141 may, for example, be of the Phillips TEA1600 type.

Each station selector switch 129 is connected to a separate one of the station selection inputs 142 of microprocessor 139 and depression of any of the switches momentarily grounds the associated input to initiate a station change in the known manner. Referring again to FIG. 18A, the particular station which is to be selected in response to operation of a particular selector switch 129 may be programmed into the microprocessor by the user of the radio in the known manner. This is accomplished by tuning the radio to the desired frequency with the dial controls 143, pushing a store button 144 and then momentarily depressing the selector switch 129 that is to be programmed to select that station.

Referring again to FIG. 19, microprocessor 139 controls a flat panel display controller 143 which causes the station information display 131 to display the frequency of the selected station and the letters AM or FM also in the known manner.

Figure 18B:
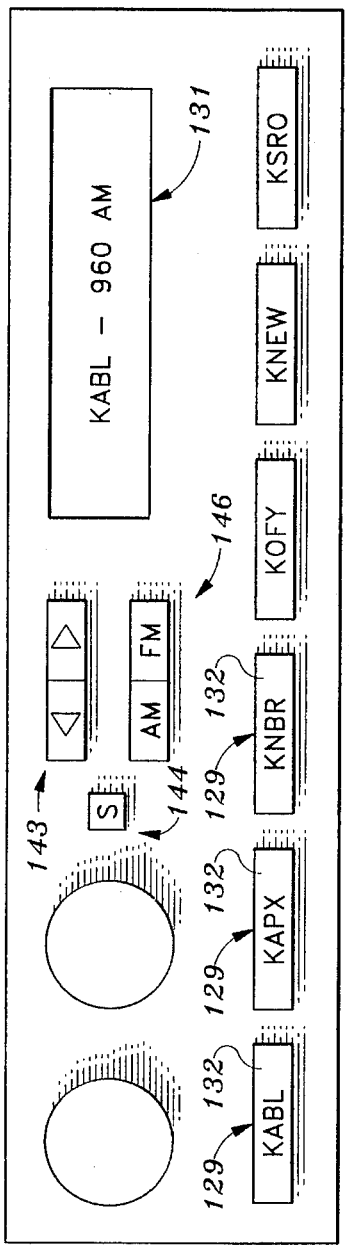
Figure 18C:
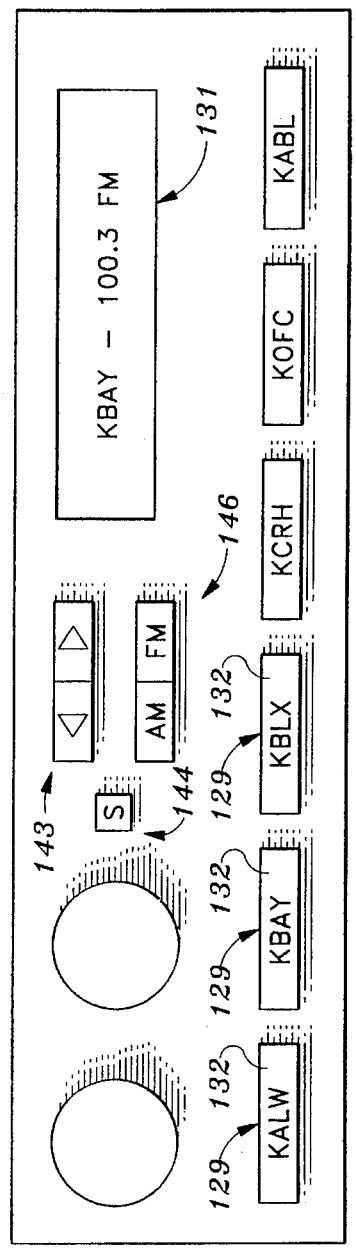

For purposes of the present invention, a read only memory 144, preferably of the erasable, user-programmable (EPROM) type, provides the microprocessor 139 with an identification of the station that corresponds to each AM and FM frequency which is broadcast in the geographical area where the radio will normally be used. This enables display of the call letters of the selected station at the station information display 131 in addition to the conventional display of station frequency and further enables a display at the face of each selector switch 129 of the call letters of the station which the switch is is programmed to select. As shown in FIG. 18B, the display at the face of the selector switches 129 changes if the switches are reprogrammed and, as shown in FIG. 18C, the displays change to indicate the different call letters of the programmed stations when the radio 128 is switched from AM operation to FM operation or vice versa by operation of the AM/FM selector buttons 146.

Optionally, microprocessor 139 can be programmed to enable any of a variety of additional interactions with the user of the radio 128. The existing controls such as station selector switches 129, dial control 143, store button 143 and others can be provided with alternate functions when combinations of such controls are actuated in conjunction with each other. The system may, for example, be caused to display a categorization of local stations by type of broadcast content at the information display 131. For example, shifting of the dial control 143 to successive predetermined frequency settings while another control is also actuated can be caused to initiate a listing of news stations at display 131 followed by a listing of sports stations, followed by a display of classical music stations, followed by displays of still other categories. As another example, the radio 128 can be provided with a connector for plugging in a computer of the lap top or notebook type which can allow the user to store notes, reminders, route directions or other data for subsequent display at the display 131.

Previously described embodiments of the invention which have a manually manipulated control member superimposed on the face of a flat panel display, such as the controls of FIGS. 1 and 2 for example, enable a close association of displayed graphics with the control member by situating only the control member at the face of the screen. Other components of the control are behind the screen and are mechanically coupled to the control member through openings in the screen. If the other components were also at the face of the screen the movable control member would in many cases be spaced outward from the displayed graphics in a manner which would make precise adjustments of the control member difficult and/or make it more difficult to recognize the particular control that particular graphics relate to. In some instances such outward spacing of the movable control member does not create such problems and it is not necessary to provide passages through the screen. For example, with reference to FIG. 20, a two way, two position toggle switch 147 that is not in close proximity to another control may be of conventional construction and simply be adhered to the face of the flat panel display screen 148. The terminals 149 of the switch 147 may be connected to the device which the switch controls through transparent conductors 151 which extend along the face of screen 148 to an edge connector 152 of the previously described kind.

Referring jointly to FIGS. 21 and 22, movements of a manually manipulated control member 153 at the screen 154 of a flat panel display 156 can be detected by sensing means 157 located behind the screen which does not require open passages through the screen.

The movable control member 153 of this example is of the turnable knob type and has a lower end which seats in an annular switch base 158 that is adhered to the face of screen 154. A small flange 159 on the knob 153 snap engages with a conforming lip 161 of the switch base 158. Although it is not essential, a Shaft 162 may extend from the switch base 158 into knob 153, along the axis of rotation of the knob, to impart the kinesthetic feel of a conventional shaft mounted knob to the mechanism.

Figure 23:
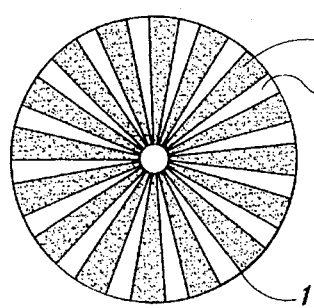
FIGS. 23 and 24 depict certain components shown in FIG. 22 in greater detail.

Sensing means 157 is of an optical form in this example and includes a tube 163 disposed at the opposite side of screen 154 from knob 153, the tube being directed at a region of the knob that is offset from the axis of rotation of the knob. The end of tube 163 contains a light source 164, which may be a laser diode for example. A lens 166 at the other end of tube 163 focuses light from source 164 at a circular coding disk 167 that is secured to the undersurface of knob 153 that faces screen 154. As best seen in FIG. 23, coding disk 167 has opaque areas 168 that alternate with transparent areas 169. The areas 168 and 169 in this example are at alternating sectors of disk 167 and are of equal dimensions and are spaced at equal angular intervals around the axis of rotation of the disk. For clarity of illustration, the coding disk 167 is shown in FIG. 23 with fewer of the areas 168 and 169 than will typically be present.

Referring again to FIGS. 21 and 22, the coding disk 167 seats in a circular recess 171 in knob 153 and a circular, centrally apertured mirror 172 is secured in the recess behind the disk to reflect light which passes through the coding disk back into tube 163. The tube 163 has a branch 173 which extends at right angles to the light path between source 164 and mirror 172 and which contains a light detector 174 which may be a photodiode for example.

Owing to the alternating opaque and transparent areas 168 and 169 on coding disk 167, turning of knob 153 causes mirror 172 to return pulses of light to tube 163, the number of such pulses which are returned being indicative of the amount of turning of the knob which has occurred. A beam splitter or half silvered mirror 176 is disposed in tube 163 at the entrance to branch 173 and is oriented to reflect a portion of the light which is returned by mirror 172 towards detector 174. Thus during turning of knob 153, the detector 174 generates a series of electrical pulses 177 the number of such pulses being indicative of the amount of movement of the knob that has taken place. The electrical circuit 178 to which detector 174 is connected may take a variety of forms depending on the type of apparatus which knob 153 controls but will in general include a pulse counter 179 which tracks the movements of knob 153 by counting pulses 177 and thus produces a signal that is indicative of the angular setting of the knob at any given time.

Figure 24:
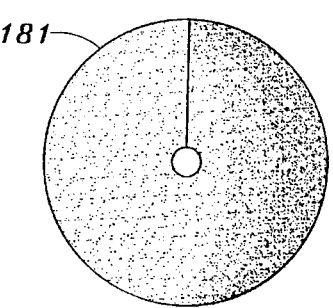

Tracking of the position of knob 153 in this manner requires that the pulse counter 179 be able to sense the direction of the angular movements of knob 153 in order to add or subtract incoming counts from the accumulated total depending on the direction of knob motion. For this purpose, a light filter disk 181 is disposed against coding disk 167 and secured thereto to turn with the coding disk. As best seen in FIG. 24, filter disk 181 has a light transmissivity that is highest at one particular radius and which progressively decreases in the angular direction around the disk. Thus, with reference again to FIGS. 21 and 22, the amount of light that is returned to tube 163 by mirror 172 is dependent on the angular orientation of the knob 153 and filter disk 181. Consequently, the height or amplitude of electrical pulses 177 progressively changes as knob 153 is turned and will increase or decrease depending on the direction of knob rotation. This enables a comparator portion 182 of the circuit 178 to compare the amplitude of each incoming pulse 177 with the amplitude of the preceding pulse and thereby determine if counter 179 is to add or subtract the current pulse count from the accumulated total count. The pulse counter 179 and comparator 182 need not necessarily be of the analog form as the functions of these components can be performed by a microprocessor or computer.

Figure 25:
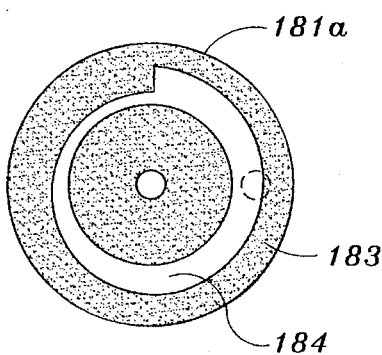

FIG. 25 depicts an alternate form of filter disk 181a that can serve the same purpose as the disk 181 of FIG. 24. The disk 181a of FIG. 25 has an opaque zone 183 which extends around the disk adjacent a transparent zone 184 which also extends the disk. Opaque zone 183 is of maximum width and transparent zone 184 is of minimum width at one particular location on the disk 181a. The opaque zone 183 becomes progressively narrower and transparent zone 184 becomes progressively wider at successive locations around the disk. Disk 181a can be substituted for the filter disk 181 of FIGS. 21 and 22 if lens 166 is removed or if the disk 181 located away from the focal point of the lens.

Optionally, the sensitivity of sensing means 157 can be increased by situating another disk 186 between filter disk 181 and tube 163, the disk 186 being stationary and being adhered to the floor of switch base 158. Disk 186 is opaque except at a sector shaped area 187 of the disk which is located at the passage 188 in the switch base 158 through which the light from source 164 travel through the switch base en route to mirror 172. Disk 186 suppresses scattered or diffracted light which might otherwise reach detector 174.

Figure 26:
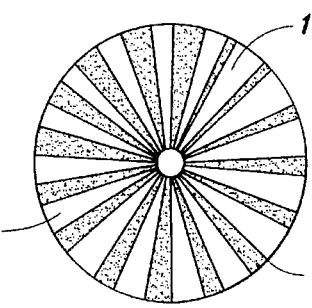
FIGS. 25 and 26 depict modified forms of certain components of the embodiment of FIG. 21.

FIG. 26 depicts an alternate form of coding disk 167a which makes it unnecessary to use the previously described filter disk for the purpose of sensing the direction of rotation of the knob. The alternate coding disk 167a again has sector shaped opaque areas 189 alternating with sector shaped transparent areas 191 but such areas are not of uniform width as in the previous case. The opaque area 189 at one particular location on the disk 167a is of maximum width and such areas 189 become of progressively diminishing width at successive angular locations around the disk while the transparent areas 191 become of progressively greater width. Thus the amount of light that is transmitted though the disk 167a, when it is substituted for the coding disk 167 of FIGS. 21 and 22, is dependent on the angular orientation of the disk. Consequently, the amplitudes of the detector output pulses 177 vary in response to turning of knob 153 in the manner previously described.

Figure 27:
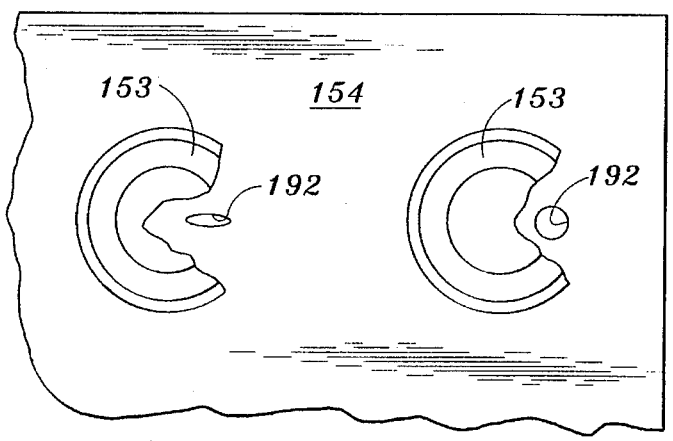
FIG. 27 is a broken out view illustrating a modification of the embodiment of FIG. 21.

Light from tube 163 is transmitted through the flat panel display screen 154 as the components of the screen including the x and y bus bar conductors in this example are transparent. It is not essential in all instances that the bus bar conductors be transparent in instances where the conductors are spaced apart sufficiently to enable light transmission between the conductors. If desired, with reference to FIG. 27, light transmission through the screen 154 can be enhanced by providing thin edge sealed openings 192 of the previously described kind in the screen at the locations where the light passes through the screen.

Referring again to FIGS. 21 and 22, the pulse count stored in counter 179 is essentially a digital or analog signal encoding the angular position of knob 153 and thus may be transmitted to any of diverse different systems that require input of such information, the previously described computer control system of FIG. 16 being one example.

The light source 164 of the embodiment of FIGS. 21 and 22 produces visible light. Sources 164 which produce radiant energy of other wavelengths, such as infrared or ultraviolet for example, can also be used along with a detector 174 that responds to the particular type of radiant energy. The coding disk 167 may be provided with different forms of marking to identify the successive angular orientations of the disk, such as bar code markings for example, and the coding disk may be eliminated if the markings which it carries are imprinted on mirror 172.

Figure 28:
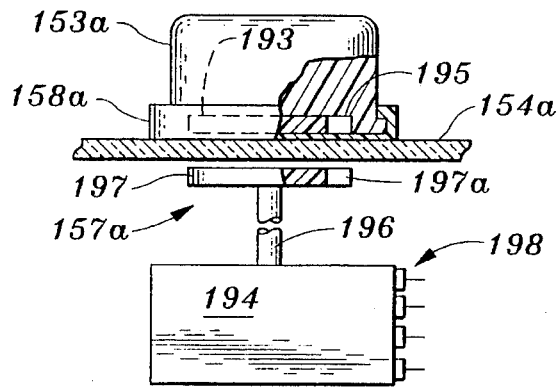
FIG. 28 is a broken out side view of a portion of still another integrated control switch and flat panel display in which settings of the switch are magnetically sensed by components behind the display screen.
Figure 29:
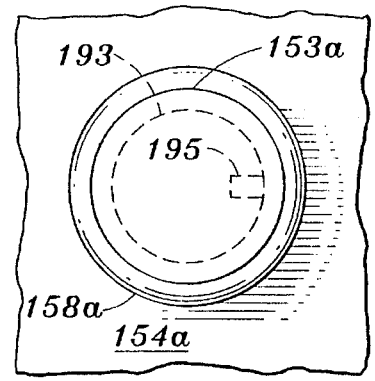
FIG. 29 is a top view of the embodiment of FIG. 28.

Sensing means 157 need not necessarily be of a type which operates by optical coupling. FIGS. 28 and 29 depict an embodiment having sensing means 157a which detects turning of a knob 153a from a location behind the display screen 154a by magnetic coupling. As in the previously described embodiment, knob 153a may be snap engaged in a switch base 158a which is itself adhered to the face of the display screen 154a. A circular plastic disk 193 is adhered to the surface of knob 153a which faces the screen 154a and a small permanent magnet 195 is embedded in the disk at one particular location around the periphery of the disk. A rotary encoder 194 of the hereinbefore discussed known form is situated behind the screen 154a and has a rotatable input shaft 196 which extends towards the screen along the axis of rotation of knob 153a. Another plastic disk 197 is secured to the end of input shaft 196 adjacent the back surface of the screen and has a small piece of ferromagnetic or magnetizable material 197a embedded in its rim at one location around the periphery of the disk.

The magnetic attraction of material 197a by magnet 195 causes the input shaft 196 of rotary encoder 194 to track the turning of knob 153a and thus the encoder shaft maintains the same angular orientation as the knob. Encoder 194 produces a multi-bit signal at output terminals 198 in the known manner that encodes the angular orientation of input shaft 196 and which is equivalent to the output signal of the previously described embodiment.

The apparatus of FIGS. 28 and 29 remains operable if the ferromagnetic material 197a is replaced with a another magnet. Magnet 195 and the ferromagnetic material 197 may be larger in instances where a stronger magnetic coupling is needed in order to turn encoder shaft 196 and the magnet may be embedded in the body of knob 153 rather than being embedded in a separate disk 193. The magnet 195 may be carried by the encoder disk 197 while the ferromagnetic material is embedded in the knob disk 193. Permanent magnet 195 may be replaced with an electromagnet although this requires additional wiring and the use of sliding contacts in some instances.

Figure 31:
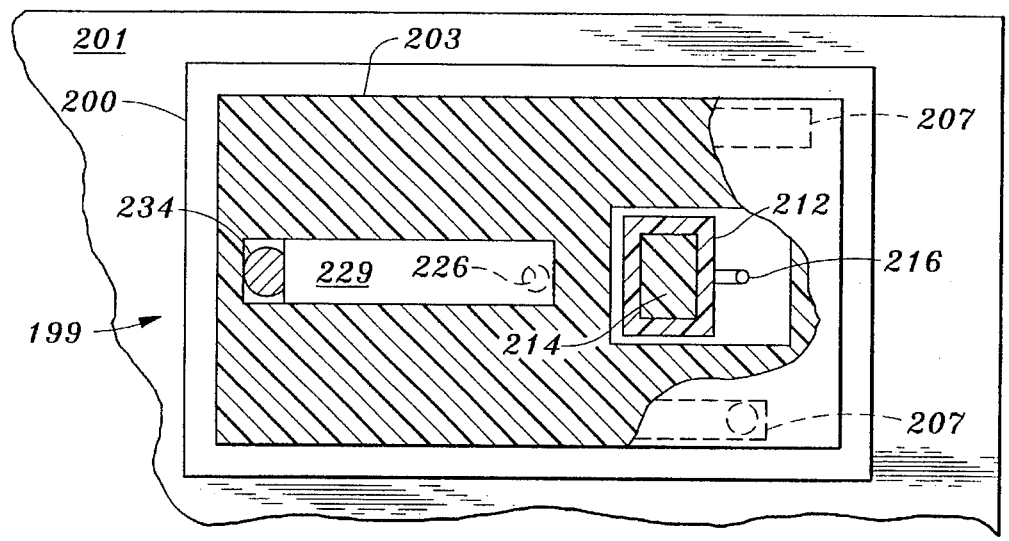
FIG. 31 is in part a top view of the apparatus of FIG. 30 and in part a section view taken along line 31—31 thereof.
Figure 30:
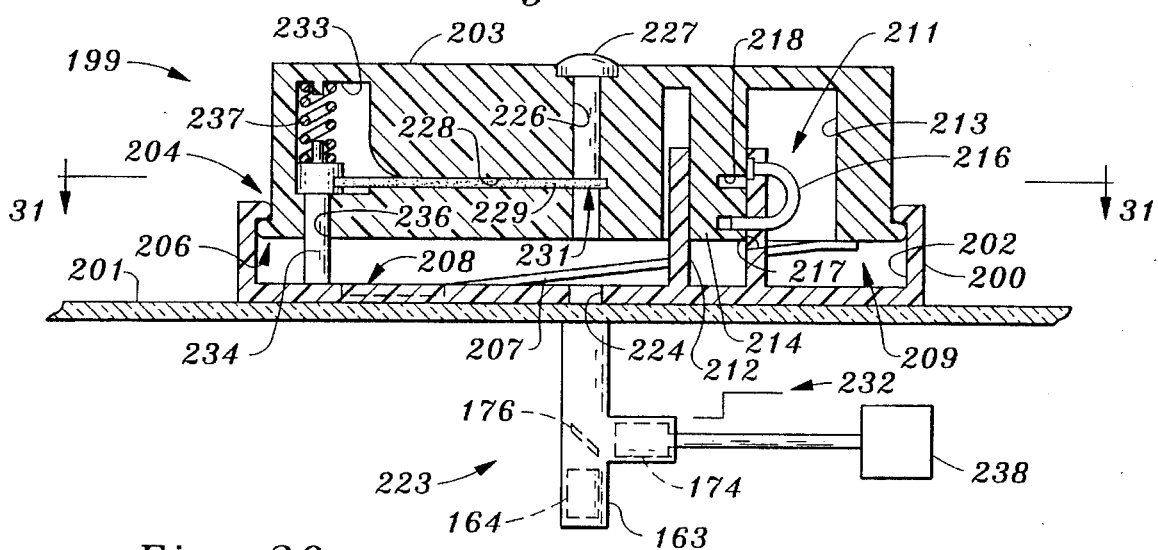
FIG. 30 is a section view of still another embodiment of the invention in which depression of a switch cap is optically sensed by components behind the flat panel display screen.

FIGS. 30 and 31 depict optical sensing of the setting of a push-button type of switch 199 from a location behind a flat panel display screen 201 when the switch is disposed at the face of the screen.

Switch 199 has a switch base 200, which is rectangular in this particular example, that is adhered to the face of the flat panel display screen 201 and which forms a chamber 202 into which the lower end of a conforming switch button or key 203 is fitted. A rounded flange 204 at the base of button 203 snap engages with a conforming lip 206 of base 201 to retain the button in engagement with the base. Leaf springs 207 which extend along opposite sides of chamber 202 each have one fixed end 208 secured to the floor of the chamber and a free end 209 which bears against the base of button 203 and urges the button away from the floor of chamber 202. Button 203 may be manually depressed against the force of springs 207 to travel the button further into chamber 202 to a position at which the switch 199 is in the actuated condition.

The switch 199 of this particular example is of the latching type wherein the switch button 203 remains in a partially depressed condition, which is the on or actuated condition of the switch, following an initial depression of the button by the operator's finger. The button 203 returns to its uppermost or off position following the subsequent depression of the button. Latching means 211 for this purpose may take a variety of forms. In the present example, switch base 200 has a hollow, rectangular latch pin support 212 which extends up into a chamber 213 in switch button 203. An integral portion 214 of switch button 203 extends downward into the interior of pin support 212. A curved, resilient latch pin 216 has an end which is secured to support 212. The pin 216 extends outward from support 212 and then turns back and extends through a slot 217 in the support and into a pin track groove 218 in portion 214 of the switch button.

Figure 33:
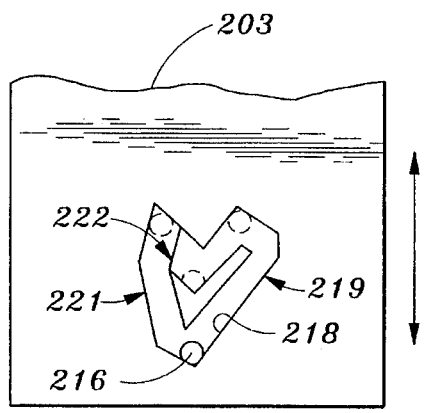
FIG. 33 depicts the configuration of a latching pin track within the embodiment of FIGS. 30 to 32.

FIG. 33 depicts the configuration of groove 218 that produces the above described latching action. The groove 218 forms a continuous heart shaped loop with a right hand lobe 219 and a left hand lobe 221 as viewed in FIG. 33. When the switch button 203 is at its uppermost or off position the latch pin 216 is seated at the bottom of the loop and prevents further upward travel of the button. The button 203 seats at the top of the right hand lobe 219 of groove 218 when the button is depressed for the first time thereby preventing further depression of the button. Upon release of the button 203 by the operator, the pin does not return to the original position as the resiliency of the pin biases the pin to move in a leftward direction. Instead, the pin seats at the uppermost junction of lobes 219 and 221 and thereby latches the switch button 203 at a partially depressed state which is the on condition of the switch. The next depression of button 203 causes the pin 216 to seat momentarily against the top of the left hand lobe 221. The pin 216 does not return to its latching position when the operator releases the button 203 as the groove 218 has a step 222 between that position and the top of the left hand lobe, the groove being deepest at the left side of the step. Consequently, the pin is guided along the left hand lobe 221 back to the lowermost junction of the two lobes 219 and 221 at which the button 203is at its uppermost or off position.

Referring again to FIGS. 30 and 31, the setting of switch 199 is detected by sensing means 223 situated behind the display panel screen 201 which means includes a light source 164, light detector 174 and beam splitter 176 disposed in a branched tube 163 in the manner previously described with respect to the embodiment of FIG. 21. Referring again to FIGS. 30 and 31, the tube 163 is positioned to direct the light from source 164 through screen 201 and an opening 224 in switch base 200 and on into a passage 226 which extends upward through switch button 203 at the center of the button. A light diffusing lens 227 is embedded in button 203 at the top of passage 226.

The light passage 226 is intersected by a slot 228 in switch button 203 in which a slidable, flexible, resilient light interceptor leaf 229 is disposed. Leaf 229 has a light reflecting undersurface 231 which extends across passage 226 when the switch button 203 is at its elevated or off position as depicted in FIGS. 30 and 31. Thus light from source 164 is reflected back to beam splitter 176 when the button 203 is at the off position. Beam splitter 176 reflects a portion of such light towards detector 174. This causes the output signal 232 of the detector 174 to be in a high state when button 203 is at its undepressed or off position.

The end of leaf 229 which is remote from light passage 226 extends into another chamber 233 within switch button 203 and is fastened to the top of a post 234 which extends downward through a passage 236 in the button and which has a lower end that abuts the floor of switch base chamber 202. A helical compression spring 237 in chamber 233 bears against the upper end of post 234 and holds the post in abutment with the floor of switch base chamber 202.

Figure 32:
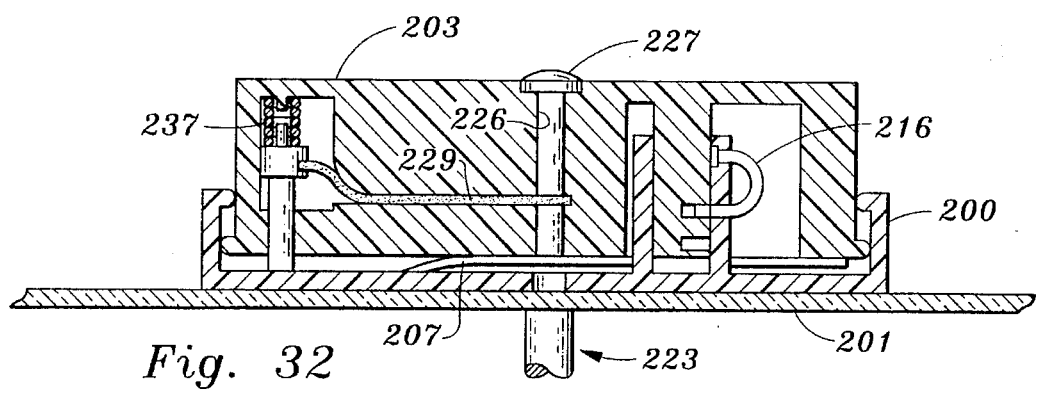
FIG. 32 is a section view corresponding to FIG. 30 showing the switch in its actuated condition.

Referring now to FIG. 32, depression of the switch button 203 to the on position of the switch causes post 234 to pull leaf 229 out of light passage 226. The output signal from light detector 174 goes low, signaling that the switch 199 is in the on condition, as light from source 164 is no longer being reflected back to the detector. The light is now emitted from the switch button 203 at lens 227 thereby providing a visual indication that the switch 199 is on. Spring 237 urges leaf 229 back into light passage 226, to the position shown in FIG. 30, when the switch button is restored to its uppermost or off position.

The output signal 232 of detector 174 can be used to control diverse types of electrical system 238. The signal can, for example, be transmitted through an inverter and an amplifier and then be used to control a relay which supplies operating power to an electrical appliance.

Figure 35:
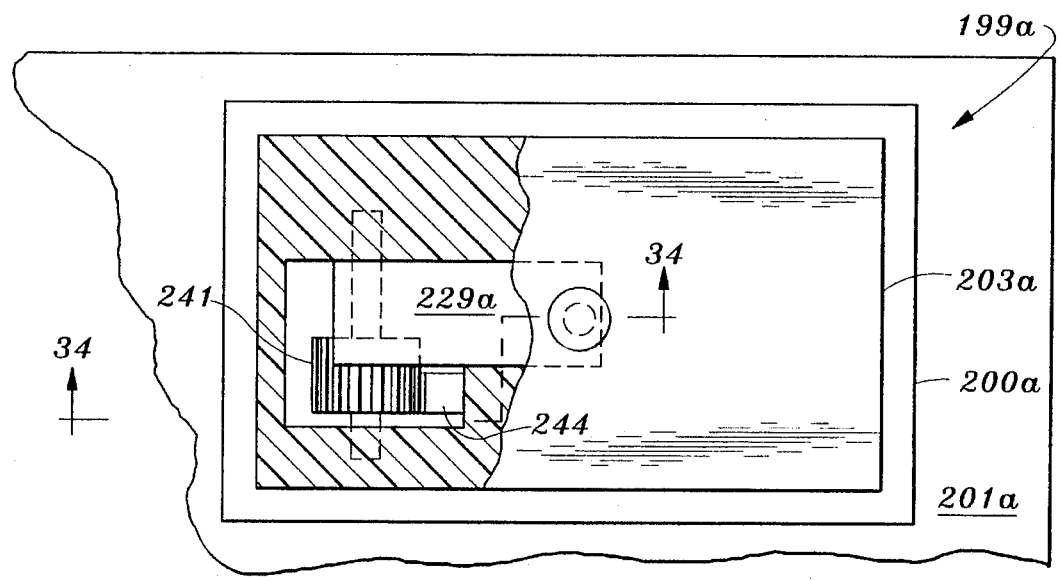
FIG. 35 is a broken out top view of the apparatus of FIG. 34.
Figure 34:
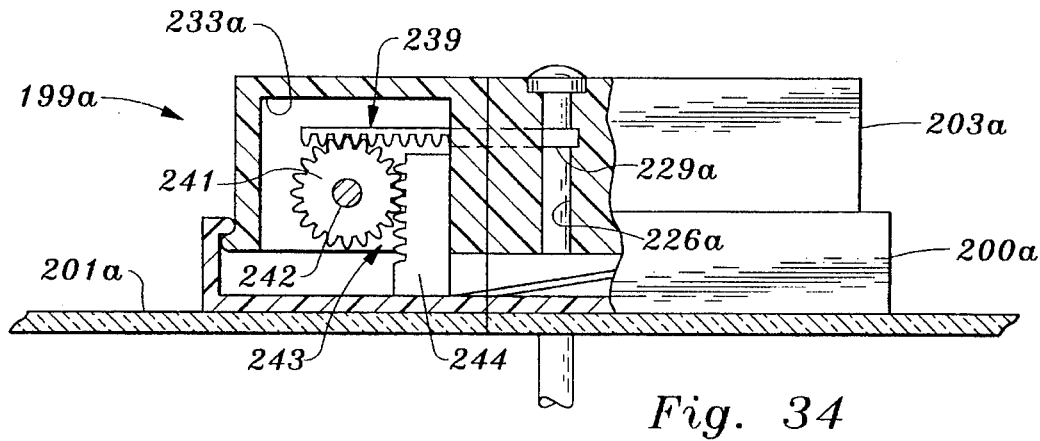
FIG. 34 is a broken out side view of a modification of the embodiment of FIGS. 30 to 33.
Figure 37:
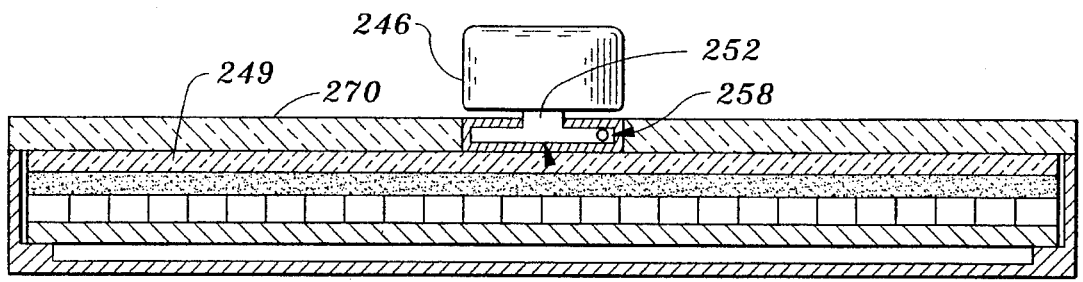
FIG. 37 is a cross section view of the apparatus of FIG. 36 taken along line 37—37 thereof.

FIGS. 34 and 35 depict a modified mechanism for traveling the light intercepting leaf 229*a* in a pushbutton switch assembly 199*a* that can otherwise be similar to the switch assembly of FIGS. 30 to 32. Referring to FIGS. 34 and 37 the leaf 229*a* is rigid in this case and is provided with a linear rack of gear teeth 239. Teeth 239 are engaged by a pinion gear 241 within a chamber 233*a* of the switch button 203*a*, the axle shaft 242 of the gear being in orthogonal relationship with leaf 229*a*.

Gear 241 also engages another linear rack of gear teeth 243 which are on a post 244 that extends up into chamber 233*a* from the switch base 200*a*. Thus depression of the switch button 203*a* causes gear 241 to turn and to thereby withdraw leaf 229*a* from the light passage 226*a*. Release of the switch button 203*a* causes the gear 241 to turn in an opposite direction and thereby travel leaf 229*a* back to the position at which it extends across the light passage 226*a*.

Switch buttons or caps of the kind found in the embodiments of FIGS. 30 to 35, such as the button 203*a* of FIG. 34, can have display screen embedded in the switch button itself in the manner previously described with reference to the embodiments of FIGS. 13 to 15 although this requires that an edge sealed opening of the above described kind be provided in the underlying display screen 201*a* to enable electrical connections to the switch button screen.

Figure 36:
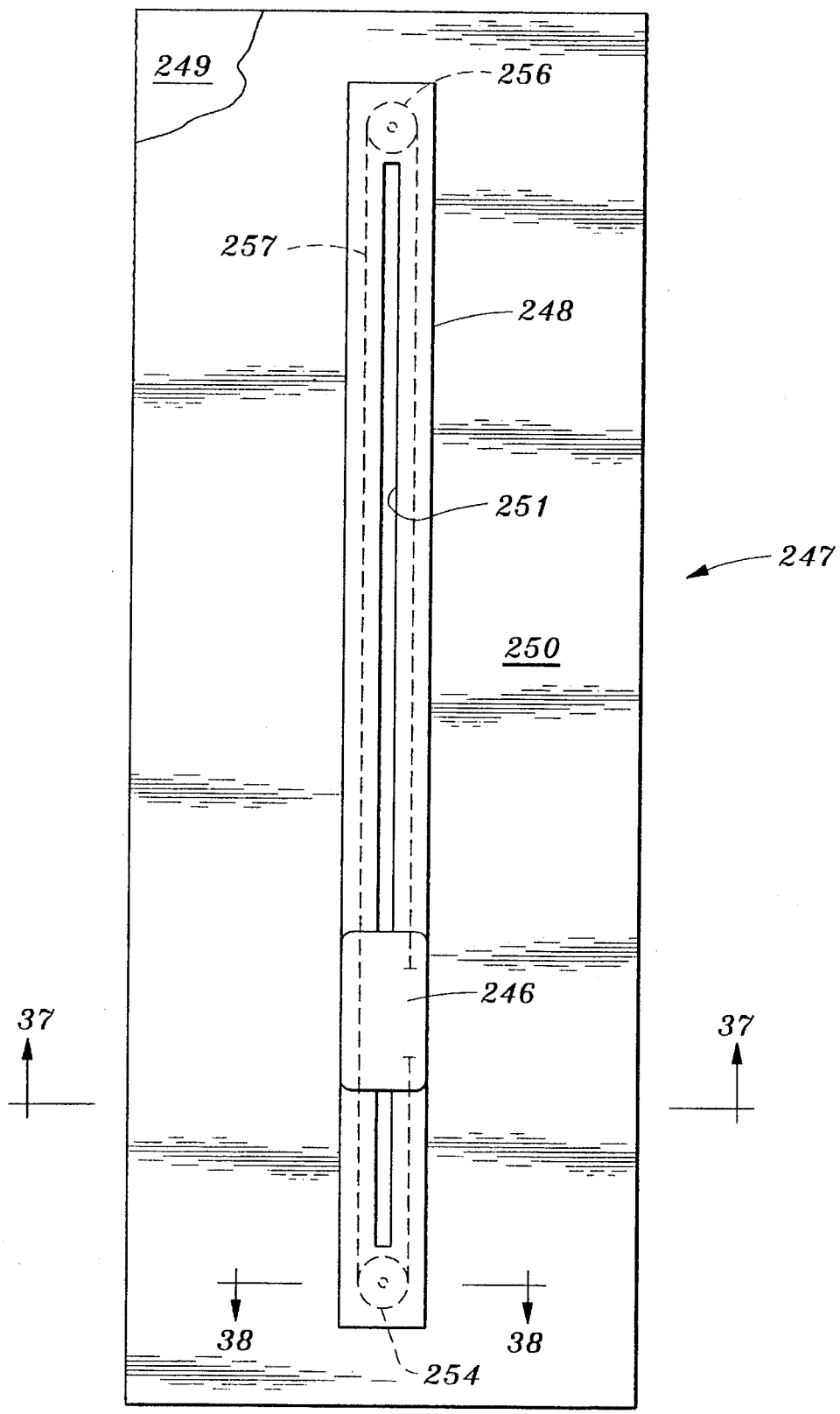
FIG. 36 is a top view of another embodiment in which a control member is slidable along the screen of a flat panel display and in which the movement is detected by components behind the screen.

Movement of a slidable control knob or the like can also be optically sensed from a location behind a flat panel display screen without requiring that there be openings in the screen. For example, with reference to FIGS. 36 and 37, the manually slidable cap 246 of a fader 247 of the general type which has been previously described can be supported by a thin elongated linear track 248 which is adhered to the face of the display panel screen 249 that displays a decibel scale and/or other graphics. The track 248 in this example has a hollow interior and an elongated slot 251 which extends along the outer face of the track. The cap 246 is secured to a stem 252 which extends into slot 251 and which has a base portion 253 that conforms in height and width with the hollow interior of the slot.

The track 248 contains a pair of rotatable pulleys 254 and 256 which are situated at opposites ends of the track and which have axes of rotation that extend at right angles to the screen 249. A flexible belt 257 is engaged on the pulleys 245 and 246 and is fastened to the cap stem base portion 253 at one side of the base portion. Belt 257 passes freely through a passage 258 at the other side of the base portion 253. Thus the belt 257 turns pulleys 254 and 256 when cap 246 is slid from one location along track 248 to another and the amount and rate of pulley rotation is proportional the distance and speed of the travel of the cap.

Figure 38:
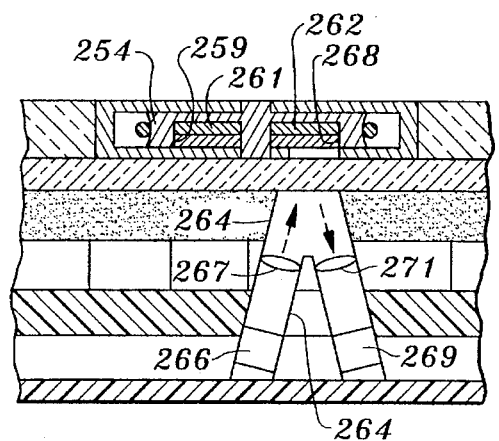
FIG. 38 is a section view taken along line 38—38 of FIG. 36.

Referring now to FIG. 38, one of the pulleys, pulley 254 in this example, has a circular recess 259 which is centered on the axis of rotation of the pulley and which faces screen 249. A circular mirror disk 261 is disposed in recess 259 behind a coding disk 262 which disks are in coaxial relationship with pulley 254 and turn with the pulley. Coding disk 262 may carry bar coding or be of one of the forms previously described with reference to the embodiment of FIGS. 21 to 26 such as the disk 167*a* of FIG. 26 which has alternating transparent and opaque sectors of progressively changing width.

Sensing means 263 are situated behind the flat panel display screen 249 within a branched tubulation 264 which has a first leg containing a light source 266 and lens 267 which focuses the light on coding disk 262 through an opening 268 in the floor of track 248. The other leg of tubulation 264 is angled relative to the first leg in order to receive light that has passed through the coding disk 262 and which has been reflected back into the tubulation 264 by mirror disk 261. The other leg contains the light detector 269 and a lens 271 that focuses the reflected light into the detector. Detector 262 produces sequences of output pulses in response to turning of the coding disk which may be counted, in the manner previously described with respect to the embodiment of FIGS. 21 to 26, to provide a signal that is indicative of the movements and current setting of the fader cap 246 which signal may be used to control amplitude in a sound processor for example.

The presence of the track 248 causes the cap 246 to protrude from screen 249 for a distance that is greater than the protrusion of the cap of a conventional fader from the surface that underlies the cap. This can be distracting to many operators of the fader. To counteract this effect, a transparent plate 270 is disposed against the face of screen 249 and has an opening conforming with the shape of track 248 in which the track is situated. Plate 270 has a thickness corresponding to the thickness of the track 248 and thus functions to create the kinesthetic feel of a conventional fader.

The sensing means may take other forms. FIGS. 39, and 40, for example, depict portions of a fader 272 which also has an elongated hollow track 273 which is adhered to the face of a display screen 274 and a cap 276 which is manually slidable along the track. As in the previous instance, cap 276 is supported by a stem 277 that extends into an elongated slot at the face of the track 273 and which has a broader base portion 278 that conforms with the interior of the track.

The pulleys 279 and 281 which are within the opposite ends of track 273 are in this instance oriented to have axes of rotation that are parallel to the screen 274 and at right angles to the track. A belt 282 is engaged on pulleys 279 and 289 within the track 273. The upper portions of belt 282 are fastened to the base portion 278 of cap stem 277 while the lower portion of the belt travels freely through a notch 283 in the base portion. Thus sliding movement of the fader cap 276 travels successive portions of belt 282 along the floor of track 273.

The outer surface of belt 282 has markings, such as bar codes 284, that enable an optical reader or bar code scanner 286 to track movement of the belt 282 as the code markings travel past a small window 287 in the floor of track 273, the scanner being behind the display screen 274.

A transparent plate 288 is disposed against the surface of the screen 274 and has a thickness similar to that of the track 273 so that the protrusion of the fader cap 276 from the underlying surface will be of conventional proportions.

Transparent plates, such as plate 288, may be used for a similar purpose in faders or the like which have openings that extend through the display screen such as in the previously described embodiment of FIGS. 9 to 11. In such cases, the routing of transparent bus bar conductors 54f around the opening 77 as depicted in FIGS. 11A and 11B may take place at the surface of the transparent plate rather than at the surface of the underlying display screen.

Referring again to FIGS. 39 and 40, sensing of the movement of a sliding fader cap 276 may be effected by means other than the optical sensing which has been described above. For example, with reference to FIG. 41, the optical reader may be replaced with a fader 289 which extends in parallel relationship with track 273 behind screen 274. The fader 289 may be of conventional design except insofar as the key cap of the fader is replaced with a magnet 291. A second magnet 292 is secured to the belt 282 within track 273. The embodiment of FIG. 41 may otherwise be similar to the embodiment of FIGS. 39 and 40.

Referring again to FIG. 41, the mutual attraction of magnets 291 and 292 causes the key cap stem 293 of fader 289 to track movements of the belt 282. Thus the fader 289 is in effect operated in the same manner that it would be directly operated by a person grasping a key cap on stem 293.

Figure 44:
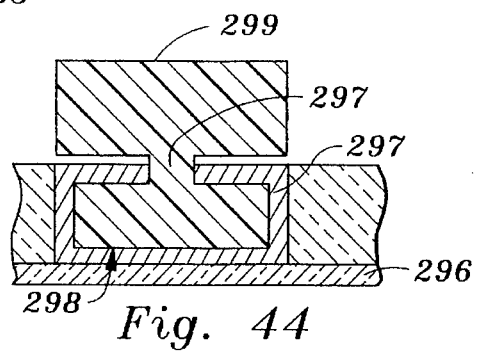
FIG. 44 is a section view taken along line 44—44 of FIG. 43.
Figure 43:
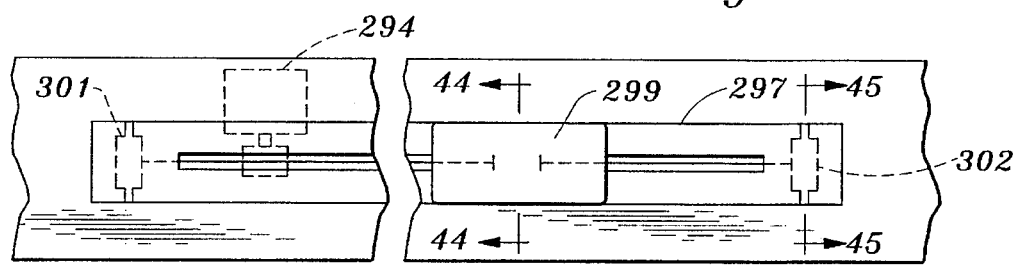
FIG. 43 is a foreshortened top view of the apparatus of FIG. 42.
Figure 42:
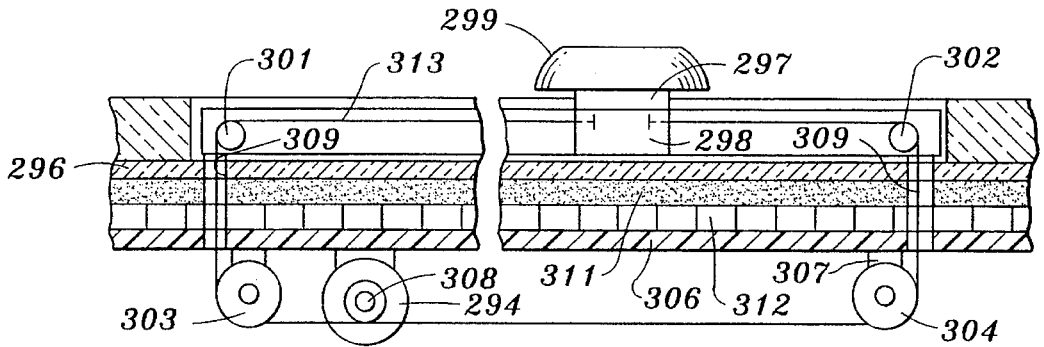
FIG. 42 is a foreshortened section view of another modification of the embodiment of FIGS. 39 and 40 in which movement of the control member is sensed by electromechanical means which extends through the display screen.

Referring now to FIGS. 42 and 43, a belt and pulley arrangement of the above described kind can also be used to effect mechanical control of a rotary encoder 294 or the like that is situated behind the display screen 296. In this example, an elongated track 297 is adhered to the face of the display screen 296 in the previously described manner and has an elongated slot through which a slidable key stem 297 extends. As best seen in FIG. 44, stem 297 has an enlarged base portion 298 which conforms with the interior of track 297 and a fader key cap 299 is secured to the portion of the stem that protrudes from the track.

Referring again to FIGS. 42 and 43, one of a pair of pulleys 301 and 302 is situated within track 297 at each end of the track and the pulleys have axes of rotation that are parallel to screen 296 and at right angles to the track. An additional pair of pulleys 303 and 304 are secured to the circuit board 306 of the flat panel display by brackets 307 and have axes of rotation that are parallel to the axes of rotation of the first pair of pulleys 301 and 302. The rotary encoder 294, which has an input shaft 308, is also secured to circuit board 306 and is situated between pulleys 303 and 304.

Figure 45:
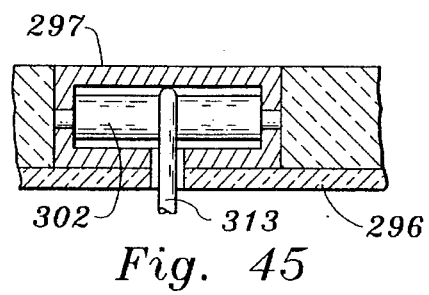
FIG. 45 is a section view taken along line 45—45 of FIG. 43.

A pair of thin edge sealed openings 309 of the previously described kind extend through the screen 296 and continue on through the light diffuser 311, back lighting diode array 312 and the circuit board 306. One such opening 309 extends between pulleys 301 and 303 and the other extends between pulleys 302 and 304. An encoder drive cable 313 has opposite ends fastened to the base portion 298 of key cap stem 297. Referring jointly to FIGS. 42 and 45, cable 313 extends from stem portion 298 around pulley 301, through the adjacent passage 309, around pulleys 303 and 304, through the adjacent passage 309, around pulley 302 and back to key cap stem portion 298. The portion of cable 313 which extends between the lowermost pulleys 303 and 304 is looped around another pulley 314 which is secured to the input shaft 308 of encoder 294. Thus manual movement of the key cap 299 turns the encoder input shaft 308 which responds in the previously described manner by producing output signals which encode the location and movements of the key cap.

The embodiment of FIGS. 42 to 45 is particularly suited for use in a motorized or automated fader system of the known kind in which initially manual motions of the fader key 299 are tracked and encoded into analog or digital signals which are stored to enable automatic repitition of the movements by drive motor means. The fader drive shaft of such a system can easily be coupled to one of the pulleys 303 or 304 to enable the automatic repetition of fader key movements.

While the invention has been disclosed with respect to certain specific embodiments for purposes of example, many other modifications and variations are possible and it is not intended to limit the invention except as defined in the following claims.

I claim:

1. Operator and electrical circuit interfacing apparatus having at least one circuit component for enabling operator interaction with the electrical circuit, said apparatus further having an electrically controlled display screen and control means for generating any of a plurality of different images at an image display area of said screen, at least a portion of said circuit component being situated at said screen within said image display area thereof, and wherein said control means generates an image on said screen that conveys information pertaining to said circuit component, said screen having at least one opening that extends through said screen at said image display area thereof and wherein at least a portion of said circuit component extends within said display screen at said opening, wherein said display screen includes a plurality of spaced apart conductors extending along said screen at said image display area thereof for creating electrical fields within said screen, each of said conductors having opposite end segments that are linear and in alignment with each other and wherein ones of said conductors which have end segments that are directed towards said opening have intermediate segments which link said end segments and which are shaped to extend along the portions of said screen that adjoin said opening.

2. The apparatus of claim 1 wherein the spacing of said intermediate segments is smaller than the spacing of said end segments of said conductors.

3. The apparatus of claim 1 wherein said intermediate segments of said conductors are of differing lengths and wherein progressively longer ones of said intermediate segments have progressively greater transverse dimensions which cause said each of said intermediate segments to have substantially the same electrical resistance.

4. Operator and electrical circuit interfacing apparatus having at least one circuit component for enabling operator interaction with the electrical circuit, said apparatus further having an electrically controlled display screen and control means for generating any of a plurality of different images at an image display area of said screen, at least a portion of said circuit component being situated at said screen within said image display area thereof, and wherein said control means generates an image on said screen that conveys information pertaining to said circuit component, said screen having at least one opening that extends through said screen at said image display area thereof and wherein at least a portion of said circuit component extends within said display screen at said opening, wherein said display screen includes a plurality of spaced apart conductors extending along one surface of said screen at said image display area thereof for creating electrical fields within said screen, each of said conductors having opposite end segments that are linear and in alignment with each other and wherein ones of said conductors which have end segments that are directed towards said opening extend through said opening and onto the opposite surface of said screen and around said opening and then back through said opening to said one surface of said screen.

5. Operator and electrical circuit interfacing apparatus having at least one circuit component for enabling operator interaction with the electrical circuit, said apparatus further having an electrically controlled display screen and control means for generating any of a plurality of different images at an image display area of said screen, at least a portion of said circuit component being situated at said screen within said image display area thereof, and wherein said control means generates an image on said screen that conveys information pertaining to said circuit component, said screen having at least one opening that extends through said screen at said image display area thereof and wherein at least a portion of said circuit component extends within said display screen at said opening, wherein said display screen includes a plurality of spaced apart conductors extending along said screen at said image display area thereof for creating electrical fields within said screen, each of said conductors having opposite end segments that are linear and in alignment with each other, further including connector means for interconnecting said end segments of ones of said conductors that are interrupted by said opening which means includes additional conductors situated at a location that is spaced apart from said screen.

6. Operator and electrical circuit interfacing apparatus having at least one circuit component for enabling operator interaction with the electrical circuit, said apparatus further having an electrically controlled display screen and control means for generating any of a plurality of different images at an images display area of said screen, at least a portion of said circuit component being situated at said screen within said image display area thereof, and wherein said control means generates an image on said screen that conveys information pertaining to said circuit component, said screen having at least one opening that extends through said screen at said image display area thereof and wherein at least a portion of said circuit component extends within said display screen at said opening, wherein said opening extends through said screen and said electrical circuit component extends through said opening and protrudes therefrom and has a control member which is movable between a plurality of positions to selectively alter an electrical characteristic of said component, wherein said screen further includes spaced apart first and second pluralities of spaced apart coplanar conductors which extend along said screen and which create electrical fields therein to generate said images, the conductors of said first and second pluralities thereof being in orthogonal relationship, each of said conductors having linear opposite end segments that are aligned with each other and wherein at least a portion of said conductors have end segments directed towards said opening, further including means for interconnecting said end segments of said portion of said conductors through conductive paths which bypass said opening.

7. Operator and electrical circuit interfacing apparatus having at least one circuit component for enabling operator interaction with the electrical circuit, said circuit component having an actuator that is manipulated by the operator and having means for producing control signals which means responds to manipulation of said actuator, said apparatus further having an electrically controlled display screen with a front face that is viewed by said operator and control means for generating any of a plurality of different images at an image display area of said screen, wherein the improvement comprises:

said actuator being situated at least in part at said front face of said screen within said image display area thereof and at least a portion of said control signal producing means being behind said screen and wherein said control signal producing means interacts with said actuator through said image display area of said screen, and wherein said control means generates an image on said screen that conveys information pertaining to said circuit component, wherein said display screen includes spaced apart front and back light transparent panels and a volume of image producing material therebetween and has edge walls which extend between said panels at right angles thereto, said screen further having a first plurality of spaced apart bus conductors which extend across said front panel at one side of said image producing material and a second plurality of spaced apart bus conductors which extend across said back panel at the other side of said image producing material, bus conductors of said second plurality thereof being in orthogonal relationship with the bus conductors of said first plurality thereof, bus conductors of said first plurality thereof having ends which are angled and which extend towards said back panel along a first edge wall of said screen and said bus conductors of said second plurality thereof having ends which are angled and which extend towards said front panel along a second edge wall of said screen, said apparatus further having connector means for connecting each of said bus conductors with said control means which connector means includes a plurality of connector conductors which extend to said first and second edge walls of said screen and each of which connects with an individual one of said bus conductors at at an edge wall of said screen.

8. Operator and electrical circuit interfacing apparatus having at least one circuit component for enabling operator interaction with the electrical circuit, said circuit component having an actuator that is manipulated by the operator and having means for producing control signals which means responds to manipulation of said actuator, said apparatus further having an electrically controlled display screen with a front face that is viewed by said operator and control means for generating any of a plurality of different images to an image display area of said screen, wherein the improvement to comprises:

said actuator being situated at least in part at said front face of said screen within said image display area thereof and at least a portion of said control signal producing means being behind said screen and wherein said control signal producing means interacts with said actuator through said image display area of said screen, and wherein said control means generates an image on said screen that conveys information pertaining to said circuit component, wherein said actuator of said circuit component for enabling operator interaction with said electrical circuit includes a knob which is selectively slidable along a path of travel at said image display area of said screen and said means for producing control signals in response to manipulation of said actuator includes a circuit control device situated at the opposite side of said screen which device has a movable input member and wherein said screen has a pair of spaced apart openings which are situated at opposite ends of the path of travel of said knob and which extend through said screen, further including a belt extending from said knob through each of said openings and being coupled to said input member of said circuit control device to operate said input member in response to movement of said knob.

* * * * *